(12) United States Patent
Ide et al.

(10) Patent No.: US 8,330,402 B2
(45) Date of Patent: Dec. 11, 2012

(54) ALTERNATING-CURRENT MOTOR CONTROL APPARATUS

(75) Inventors: Kozo Ide, Kitakyushu (JP); Shinya Morimoto, Kitakyushu (JP); Masanobu Inazumi, Kitakyushu (JP); Young Doo Yoon, Seoul (KR); Seung-ki Sul, Seoul (KR)

(73) Assignees: Kabushiki Kaisha Yaskawa Denki, Kitakyushu-Shi (JP); Young Doo Yoon, Seoul (KR); Seung-Ki Sul, Seoul (KR)

( * ) Notice: Subject to any disclaimer, the term of this patent is extended or adjusted under 35 U.S.C. 154(b) by 459 days.

(21) Appl. No.: 12/690,904

(22) Filed: Jan. 20, 2010

(65) Prior Publication Data

US 2010/0207555 A1  Aug. 19, 2010

(30) Foreign Application Priority Data

Jan. 21, 2009 (JP) ................... 2009-010732

(51) Int. Cl.
 *H02P 21/00* (2006.01)
(52) U.S. Cl. ................ 318/400.02; 318/400.01
(58) Field of Classification Search .......... 318/700, 318/400.01, 400.02, 400.32, 400.33
See application file for complete search history.

(56) References Cited

U.S. PATENT DOCUMENTS

| | | | | |
|---|---|---|---|---|
| 6,137,258 | A * | 10/2000 | Jansen | 318/802 |
| 6,555,988 | B2 | 4/2003 | Masaki et al. | |
| 6,801,011 | B2 * | 10/2004 | Ide | 318/700 |
| 7,348,749 | B2 * | 3/2008 | Ide et al. | 318/599 |
| 2001/0002784 | A1 | 6/2001 | Masaki et al. | |
| 2004/0113582 | A1 * | 6/2004 | Ide | 318/717 |
| 2004/0232862 | A1 * | 11/2004 | Wogari et al. | 318/254 |
| 2007/0069682 | A1 * | 3/2007 | Ide et al. | 318/719 |
| 2007/0132424 | A1 * | 6/2007 | Takao et al. | 318/806 |
| 2008/0197799 | A1 * | 8/2008 | Tomigashi | 318/768 |
| 2010/0090632 | A1 * | 4/2010 | Maekawa | 318/400.33 |
| 2010/0156334 | A1 * | 6/2010 | Nishimura et al. | 318/400.33 |
| 2010/0194319 | A1 * | 8/2010 | Ito et al. | 318/400.13 |
| 2011/0204831 | A1 * | 8/2011 | Iwaji et al. | 318/244 |

FOREIGN PATENT DOCUMENTS

| | | |
|---|---|---|
| JP | 2001-169590 | 6/2001 |
| JP | 3454212 | 6/2001 |
| JP | 2004-032908 | 1/2004 |
| JP | 4026427 | 1/2004 |

OTHER PUBLICATIONS

Masaki et al. Position Sensorless Control System of IPM Motor Based on Voltage Injection Synchronized with PWM Carrier T. IEE Japan, 2002, pp. 37 to 44, vol. 122-D, No. 1.

* cited by examiner

*Primary Examiner* — Eduardo Colon Santana
(74) *Attorney, Agent, or Firm* — Ditthavong Mori & Steiner, P.C.

(57) ABSTRACT

An alternating-current motor control apparatus includes a voltage controller configured to output a command voltage vector so that the command voltage vector is time-averaged for time periods, a square-wave voltage generator configured to control, every time period, amplitudes and phases of voltages to be applied to an alternating-current motor, a current detector configured to detect motor currents at a timing synchronized with periods 1/N-th of the time periods, where N is equal to or larger than one, a coordinate transformation section configured to perform coordinate transformation to transform the motor currents into two-phase currents, an envelope extractor configured to extract two-phase currents as waveforms having amplitudes that periodically change from the two-phase currents, and extract envelopes of the waveforms, and a magnetic-pole-position computing section configured to compute a magnetic-pole position using the envelopes.

13 Claims, 16 Drawing Sheets

ALTERNATING-CURRENT MOTOR CONTROL APPARATUS

CROSS-REFERENCE TO RELATED APPLICATION

The present application is related to Japanese Patent application No. 2009-010732, filed Jan. 21, 2009. The contents of this application are incorporated herein by reference in their entirety.

BACKGROUND OF THE INVENTION

1. Field of the Invention

The present invention relates to an alternating-current (AC) motor control apparatus.

2. Discussion of the Background

As a method for estimating the position and speed of an AC motor, a method in which the position and speed of a motor are estimated using detected values or estimated values of induced voltages of the motor, and a method in which the position and speed of a motor are estimated using inductance characteristics (a magnetic saliency) that depend on a magnetic-pole position of the motor have been proposed. A method with which the position and speed of a motor can be estimated over a range from an extremely low speed including a zero speed to a high speed is the latter estimation method. More particularly, in a case in which position control is performed, it is necessary to determine the position of a motor in a state in which the motor halts at a predetermined rotational position, i.e., at the zero speed at which induced voltages become zero. Accordingly, in this case, the latter estimation method, with which the position and speed of a motor can be estimated even when induced voltages are zero, is suitable.

Generally, in the latter estimation method, high-frequency test signals are applied to a motor, and a magnetic-pole position is estimated using detected values of voltages or currents that are generated by applying the test signals. The estimation method has a problem that noise occurs in a frequency band of the test signals, and a problem that responsiveness in estimation of the position and the speed of the motor becomes low because of utilization of filters which extract currents or voltages having a frequency in the frequency band of the test signals or the like.

For example, in Japanese Unexamined Patent Application Publication No. 2001-169590, a control apparatus for controlling, using pulse with modulation (PWM) signals that are synchronized with carrier waves, voltages to be applied to a motor is disclosed, and a scheme for estimating the position of a rotor of the motor by detecting motor currents in synchronization with the carrier waves is proposed. In this scheme, the voltages that are to be applied as high-frequency test signals are changed every period that is half of the period of the carrier waves. The motor currents that are generated by applying the voltages are detected, and a current differential vector is determined every period that is half of the period of the carrier waves. Next, the current differential vector is obtained twice, and the difference between the obtained two current differential vectors (hereinafter, referred to as a "current difference differential vector") is computed. The difference between two voltage vectors of the voltages to be applied (hereinafter, referred to as a "voltage differential vector"), which corresponds to the current difference differential vector, is computed. The voltages to be applied are controlled so that the phase difference between the current difference differential vector and the voltage differential vector is made to be zero. When the phase difference is made to be zero, the phase of the voltage differential vector is directed to a magnetic-pole position. Accordingly, the voltages to be applied are controlled so that the phase difference is made to be zero.

SUMMARY OF THE INVENTION

According to one aspect of the present invention, an AC motor control apparatus includes a voltage controller, a square-wave voltage generator, a current detector, a coordinate transformation section, and an envelope extractor. The voltage controller is configured to output a command voltage vector so that the command voltage vector is time-averaged for time periods which are arbitrarily set. The square-wave voltage generator is configured to control, using a square-wave voltage command that is alternately changed in positive and negative directions every time period, amplitudes and phases of voltages to be applied to an AC motor. The current detector is configured to detect motor currents at a timing that is synchronized with periods which are 1/N-th of the time periods, where N is equal to or larger than one. The coordinate transformation section is configured to perform coordinate transformation to transform detected values of the motor currents into two-phase currents in a coordinate system at rest. The envelope extractor is configured to take, as inputs, the two-phase currents, configured to extract two-phase currents as waveforms having amplitudes that periodically change from the input two-phase currents, and configured to extract envelopes connecting vertices of the amplitudes of the waveforms. The magnetic-pole position and speed of the AC motor are estimated and computed using the outputs of the envelope extractor.

According to another aspect of the present invention, an alternating-current motor control apparatus includes a voltage controller, a square-wave voltage generator, a current detector, a first coordinate transformation section, a second coordinate transformation section, an envelope extractor, and a magnetic-pole-position and speed computing section. The voltage controller is configured to output a command voltage vector so that the command voltage vector is time-averaged for time periods which are arbitrarily set. The square-wave voltage generator is configured to control, using a square-wave voltage command that is alternately changed in positive and negative directions every time period, amplitudes and phases of voltages to be applied to an alternating-current motor. The current detector is configured to detect motor currents at a timing that is synchronized with periods which are 1/N-th of the time periods, where N is equal to or larger than one. The first coordinate transformation section is configured to perform coordinate transformation to transform detected values of the motor currents into two-phase currents in a coordinate system at rest. The second coordinate transformation section is configured to perform coordinate transformation to transform, into two-phase currents in a rotating coordinate system for a phase that is 45 degrees delayed from a control magnetic-pole position, at least currents that are included in the two-phase currents in the coordinate system at rest and that are generated in accordance with provision of the square-wave voltage command. The envelope extractor is configured to extract, from the two-phase currents in the rotating coordinate system, current elements that are generated in accordance with provision of the square-wave voltage command, and configured to extract, as two scalar currents, envelopes connecting vertices of the amplitudes of the current elements. The magnetic-pole-position and speed computing section is configured to estimate a magnetic-pole position using the two scalar currents that are outputs of the envelope extractor, and configured to compute a speed of the alternating-current motor.

According to further aspect of the present invention, an alternating-current motor control apparatus includes a voltage controller, a square-wave voltage generator, a current detector, a first coordinate transformation section, a second coordinate transformation section, an envelope extractor, and a magnetic-pole-position and speed computing section. The voltage controller is configured to output a command voltage vector so that the command voltage vector is time-averaged for time periods which are arbitrarily set. The square-wave voltage generator is configured to control, using a square-wave voltage command that is alternately changed in positive and negative directions every time period, amplitudes and phases of voltages to be applied to an alternating-current motor. The current detector is configured to detect motor currents at a timing that is synchronized with periods which are 1/N-th of the time periods, where N is equal to or larger than one. The first coordinate transformation section is configured to perform coordinate transformation to transform detected values of the motor currents into two-phase currents in a coordinate system at rest. The second coordinate transformation section is configured to perform coordinate transformation to transform, into two-phase currents in a rotating coordinate system for a phase that is 45 degrees delayed from a control magnetic-pole position, at least currents that are included in the two-phase currents in the coordinate system at rest and that are generated in accordance with provision of the square-wave voltage command. The envelope extractor is configured to extract, from the two-phase currents in the rotating coordinate system, current elements that are generated in accordance with provision of the square-wave voltage command, and configured to extract, as two scalar currents, envelopes connecting vertices of the amplitudes of the current elements. The magnetic-pole-position and speed computing section is configured to estimate a magnetic-pole position using the two scalar currents that are outputs of the envelope extractor, and configured to compute a speed of the alternating-current motor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
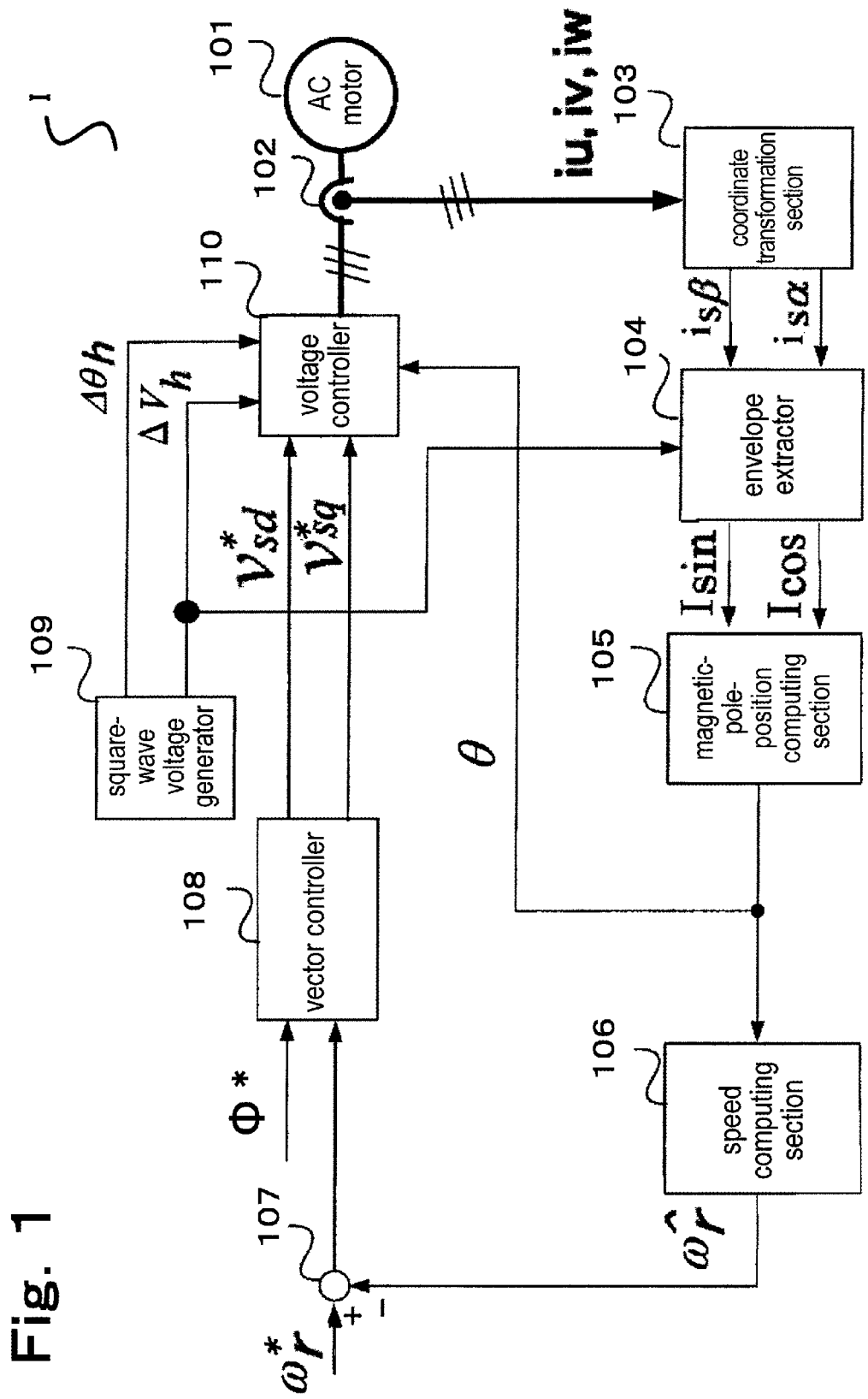
FIG. 1 is a block diagram of an AC motor control apparatus according to a first embodiment.

The embodiments will now be described with reference to the accompanying drawings, wherein like reference numerals designate corresponding or identical elements throughout the various drawings.

An AC motor control apparatus that is provided with a voltage controller has been known. The voltage controller outputs a command voltage vector using a space voltage-vector modification method so that the command voltage vector is time-averaged for time periods which are arbitrarily set. When the space voltage-vector modification method is used, with respect to the central time of each of the time periods that are arbitrarily set, output patterns of a voltage in time periods that are half of the time periods before and after the central time are completely symmetric. Accordingly, the space voltage-vector modification method is characterized in that noise elements other than current elements which are used in computation of a magnetic-pole position and in computation of a speed can be reduced to the maximum degree.

Using such an AC motor control apparatus, the amplitudes and phases of voltages to be applied to a motor are controlled using a square-wave voltage command that is supplied from a square-wave voltage generator, and coordinate transformation is performed to transform detected values of motor currents into two-phase currents in a coordinate system at rest. Envelopes connecting vertices of the amplitudes, which periodically change, of the two-phase currents are extracted. In this case, information concerning the envelopes includes information concerning a magnetic-pole position. Using the information concerning a magnetic-pole position, the magnetic-pole position can be estimated with a high accuracy without a delay time.

FIG. 1 is a block diagram of an AC motor control apparatus 1 according to a first embodiment of the present invention.

The AC motor control apparatus 1 includes an AC motor 101, a current detector 102 that detects motor currents which flow through the AC motor 101 (currents having two phases or three phases among an U phase, a V phase, and a W phase, and, hereinafter, also referred to as "$i_u$, $i_v$, and $i_w$"), and a coordinate transformation section 103 that transforms the motor currents into two-phase currents ($i_{s\alpha}$ and $i_{s\beta}$) in a coordinate system at rest.

Furthermore, the AC motor control apparatus 1 includes an envelope extractor 104, which is described below, a magnetic-pole-position computing section 105, and a speed computing section 106. The speed computing section 106 computes a speed estimation value $\hat{\omega}_r$ by differentiating a magnetic-pole position θ that is an output of the magnetic-pole-position computing section 105.

Additionally, the AC motor control apparatus I includes a subtracter 107 and a vector controller 108. The subtracter 107 outputs a deviation between a speed command value $\omega_r^*$ and the speed estimation value $\hat{\omega}_r$. The vector controller 108 takes the deviation and a magnetic-flux command value $\Phi^*$ as inputs, determines magnetic-flux elements and torque elements of the motor currents so that the speed command value $\omega_r^*$ and the speed estimation value $\hat{\omega}_r$ will coincide each other, and outputs, as two-phase voltage command values ($v_{sd}^*$ and $v_{sq}^*$) in a rotating coordinate system, voltage command values for controlling the speed and motor currents of the AC motor 101.

Moreover, the AC motor control apparatus I includes a square-wave voltage generator 109 and a voltage controller 110. The square-wave voltage generator 109 alternately changes a square-wave voltage command $V_h$ in positive and negative directions every time period $2T_s$ that is arbitrarily set, and superimposes the square-wave voltage command $V_h$ on the two-phase voltage command values ($v_{sd}^*$ and $v_{sq}^*$), whereby controlling the amplitudes and phases of voltages to be applied to the AC motor 101. The voltage controller 110 outputs, using the space voltage-vector modification method, a command voltage vector $v_s^*$ so that that the command voltage vector $v_s^*$ is time-averaged for the time periods which are arbitrarily set, thereby applying the desired voltages using semiconductor switches to the AC motor 101.

Figure 15A:
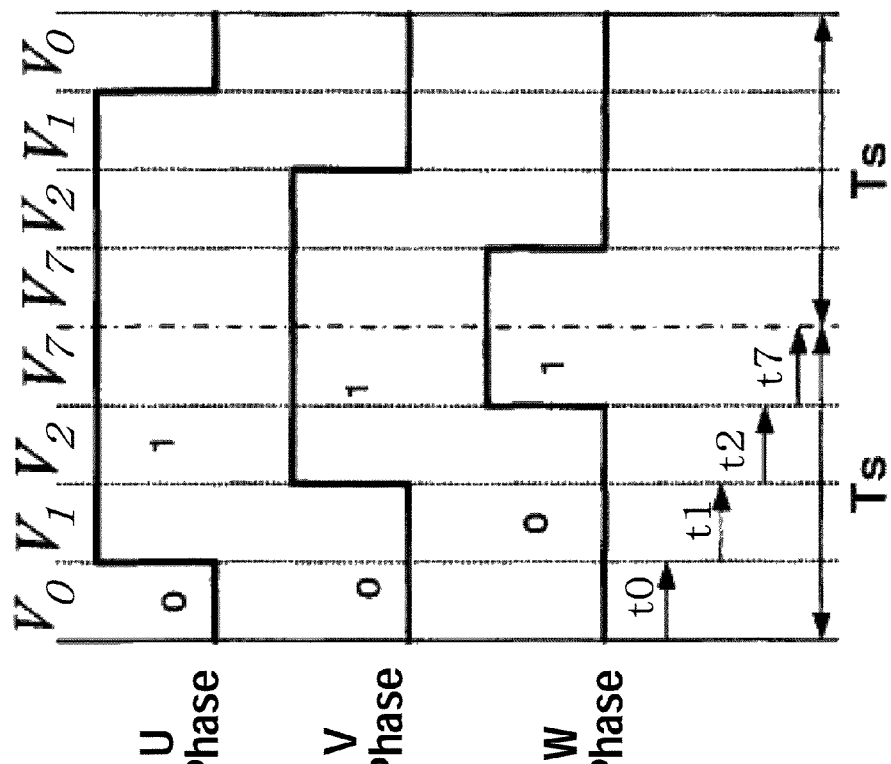
FIGS. 15A and 15B are diagrams for explaining a space voltage-vector modification method.
Figure 15B:
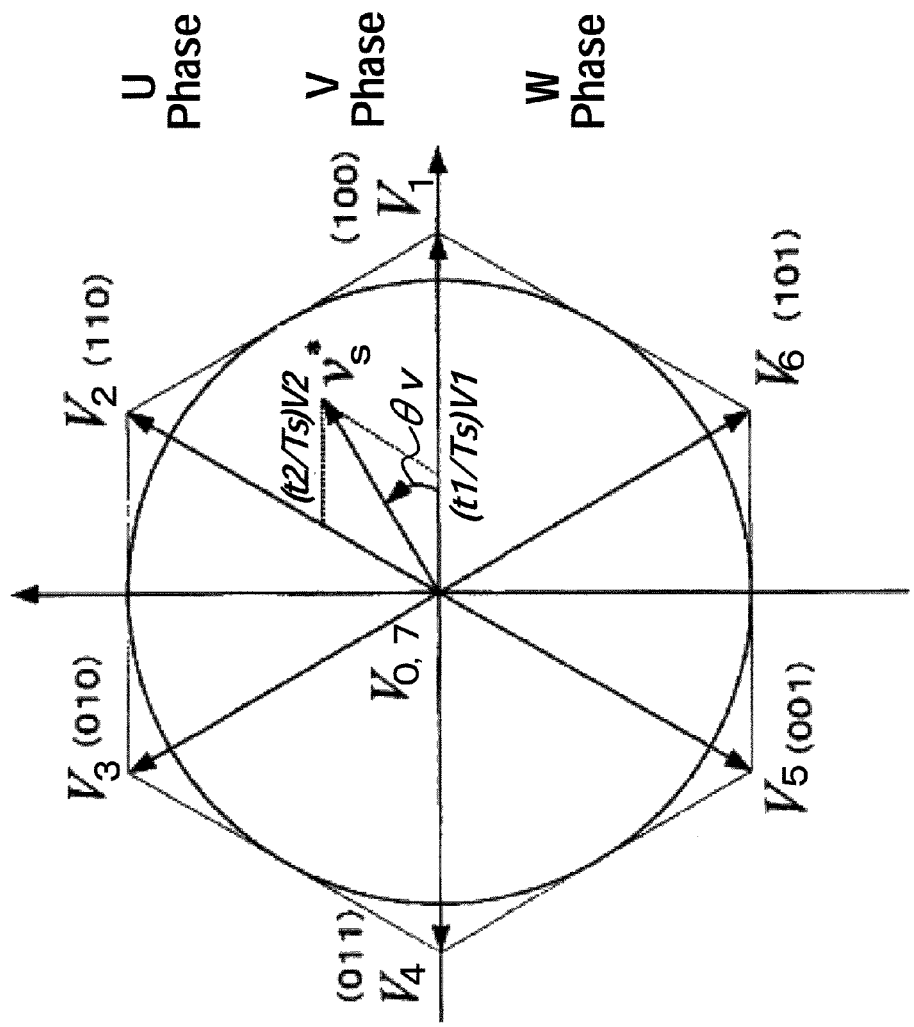

First, the space voltage-vector modification method will be described with reference to FIGS. 15A and 15B. In FIGS. 15A and 15B, a time period that is arbitrarily set is denoted by $2T_s$.

In FIG. 15A, fundamental vectors $V_1$ to $V_7$ used in space voltage-vector modification are illustrated. In an example illustrated in FIG. 15A, using two voltage vectors $V_1$ and $V_2$ adjacent to each other with which the command voltage vector $v_s^*$ can be realized, the command voltage vector $v_s^*$ is formed so as to be time-averaged.

Here, $V_1$(100) indicates a state in which the upper semiconductor switch for the U phase of a three-phase inverter is turned on (the lower semiconductor switch is turned off), and in which the upper semiconductor switches for the V and W phases are turned off (the lower semiconductor switches are turned on). On the other hand, $V_2$(110) indicates a state in which the upper semiconductor switches for the U and V phases are turned on (the lower semiconductor switches are turned off), and in which the upper semiconductor switch for the W phase is turned off (the lower semiconductor switch is turned on).

Using the representations for states, the switching states of the individual phases in each of the time periods $2T_5$ are illustrated in FIG. 15B. On-times $t_1$ and $t_2$ can be calculated in accordance with Equation (1) using a phase angle $\theta_V$ between the fundamental vector $V_1$ and the command voltage vector $v_s^*$, an amplitude $|V_s^*|$ of the command voltage vector $v_s^*$, and a maximum output voltage $V_{max}$ of the voltage controller 110.

$$t_1 = \frac{2}{\sqrt{3}} \frac{|v_s^*|}{V_{max}} T_s \cdot \sin\left(\frac{\pi}{3} - \theta_v\right) \quad (1)$$

$$t_2 = \frac{2}{\sqrt{3}} \frac{|v_s^*|}{V_{max}} T_s \cdot \sin\theta_v$$

Updating of the command voltage vector $v_s^*$ is performed every time period $T_s$ that is half of the time period $2T_s$ which is arbitrarily set. Off-times $t_0$ and $t_7$ are determined by subtracting the on-times $t_1$ and $t_2$ from the time period $T_s$ to obtain a time period and by dividing the obtained time period into two time periods, and are set. Even when the command voltage vector $v_s^*$ exists in any one of the other quadrants, the command voltage vector $v_s^*$ is determined in a manner similar to the above-mentioned manner.

Next, an operation of the square-wave voltage generator 109 will be described with reference to FIG. 3. Here, for simplicity of the description, it is supposed that the two-phase voltage command values ($v_{sd}^*$ and $v_{sq}^*$) that are outputs of the vector controller 108 are not changed in each of the time periods $2T_s$.

Figure 3:
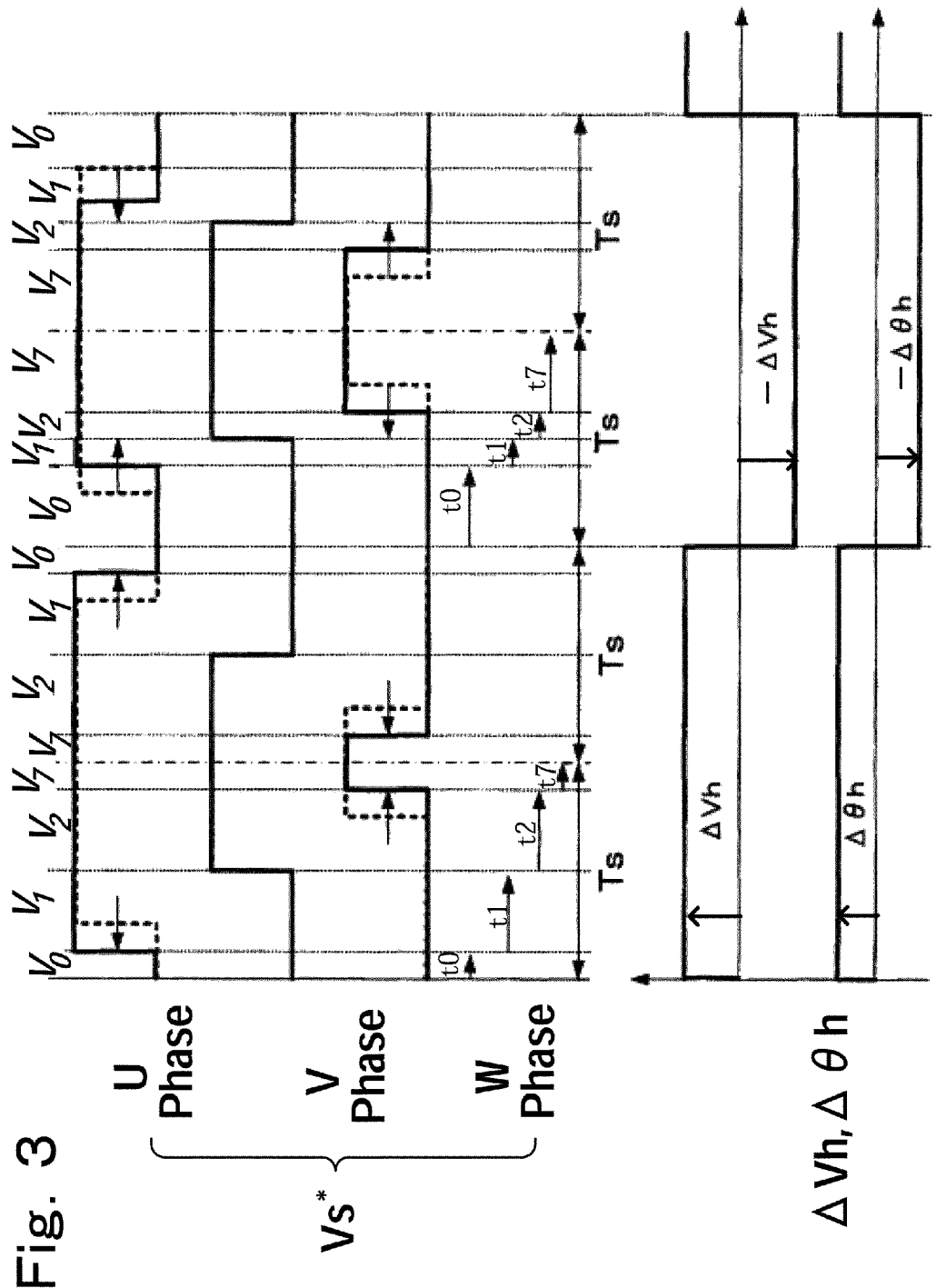
FIG. 3 is a diagram for explaining an operation of a square-wave voltage generator.

FIG. 3 is a timing diagram of displays of the three-phase voltages (having the U phase, V phase, and W phase) of the command voltage vector $v_s^*$, and, the square-wave voltage command $V_h$ (a voltage amplitude command $\Delta V_h$ and a phase command $\Delta \theta_h$) that is output from the square-wave voltage generator 109.

The square-wave voltage generator 109 outputs the voltage amplitude command $\Delta V_h$ and the phase command $\Delta \theta_h$ of the square-wave voltage command $V_h$ so that the voltage amplitude command $\Delta V_h$ and the phase command $\Delta \theta_h$ are alternately changed in positive and negative directions every time period $2T_s$.

The voltage controller 110 determines the on-times $t_1$ and $t_2$ for the three-phase voltages shown in FIG. 3 in accordance with Equation (2) using the voltage amplitude command $\Delta V_h$ and the phase command $\Delta \theta_h$. Accordingly, the on-times $t_1$ and $t_2$ are repeatedly expanded or reduced every time period $2T_s$.

$$t_1 = \frac{2}{\sqrt{3}} \frac{|v_s^* + \Delta V_h|}{V_{max}} T_s \cdot \sin\left(\frac{\pi}{3} - \theta_v + \Delta \theta_h\right) \quad (2)$$

$$t_2 = \frac{2}{\sqrt{3}} \frac{|v_s^* + \Delta V_h|}{V_{max}} T_s \cdot \sin(\theta_v + \Delta \theta_h)$$

Figure 4:
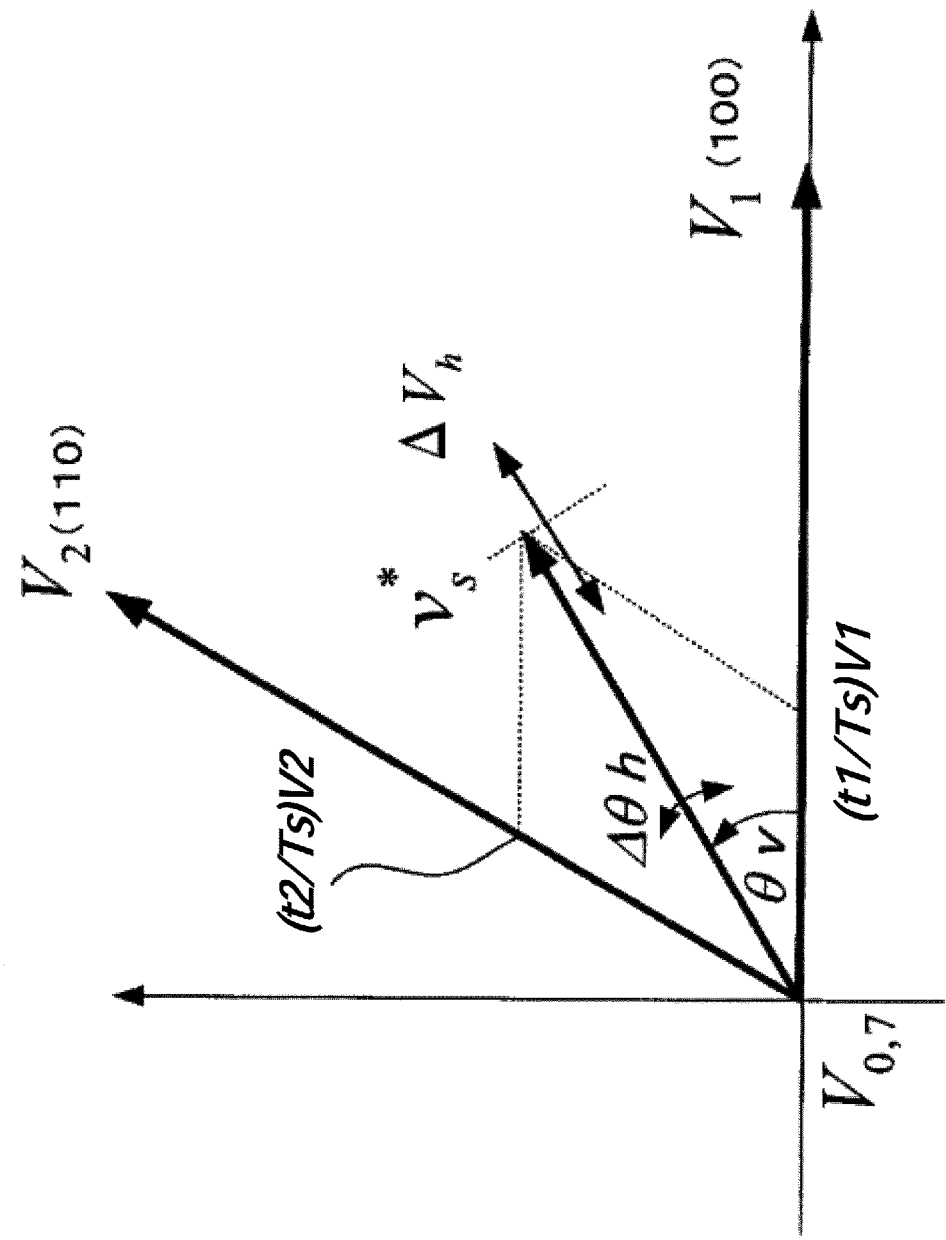
FIG. 4 is a diagram for explaining a variation in a command voltage vector when the square-wave voltage generator operates.

FIG. 4 illustrates a variation in the command voltage vector $v_s^*$ in this case. Every time period $2T_5$, the amplitude of the command voltage vector $v_s^*$ is repeatedly increased or decreased by $\Delta V_h$, and the phase of the command voltage vector $v_s^*$ is repeatedly advanced or delayed by $\Delta \theta_h$.

Figure 5:
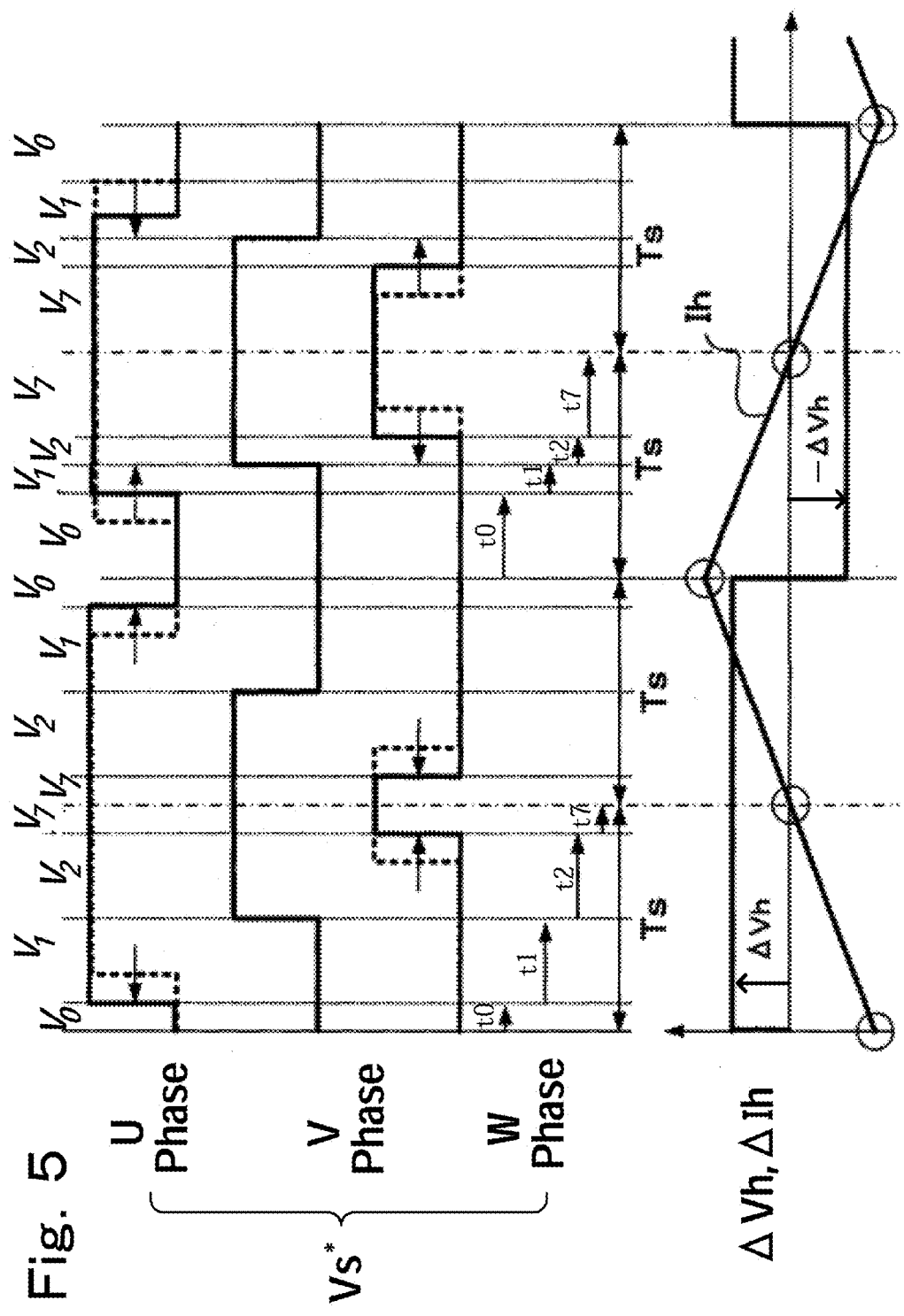
FIG. 5 is a diagram for explaining the relationships, when the square-wave voltage generator operates, among three-phase voltages (having a U phase, a V phase, and a W phase) of the command voltage vector, a square-wave voltage command, and an output current that is generated by providing the square-wave voltage command.

FIG. 5 illustrates the relationships among the three-phase voltages (having the U phase, V phase, and W phase) of the command voltage vector $v_s^*$ in this case, the square-wave voltage command $V_h$, and an output current $I_h$ that is generated by providing the square-wave voltage command $V_h$. In this case, the waveform of the output current $I_h$ is a triangular waveform. The frequency of the output current $I_h$ is represented by an equation $f_h = 1/(4T_s)$, i.e., is a frequency that is half of a switching frequency of the semiconductor switches.

Next, a method for computing the magnetic-pole position θ using the output current $I_h$ will be described.

First, a fact that information obtained using the output current $I_h$ includes information concerning the magnetic-pole position θ will be described.

In the first embodiment, a timing at which detection of the motor currents is performed by the current detector 102 is indicated by the circles on the waveform of the output current $I_h$ illustrated in FIG. 5. As is clear from FIG. 5, detection of the motor currents is performed every time period $T_s$. Note that detection of the motor currents can be performed at any timing which is synchronized with periods equal to or shorter than periods (which correspond to $2T_s$) that are half of the periods of the waveform of the output current $I_h$.

The timing at which detection of the motor currents is performed corresponds to points at which voltages that are to be applied in order to drive the AC motor 101 are zero. Accordingly, there is an advantage that the detection of the motor currents is not easily influenced by noise or the like. However, in reality, when the motor currents are detected, high-frequency elements associated with switching of the semiconductor switches are also detected because of a delay in the timing at which detection of the motor currents is performed.

Thus, the detected motor currents ($i_u$, $i_v$, and $i_w$) include fundamental-wave elements of the command voltage vector $v_s^*$, frequency elements $f_h$ of the output current $I_h$, and high-frequency elements ($4f_h$) having a frequency that is twice higher than the switching frequency of the semiconductor switches. The detected motor currents ($i_u$, $i_v$, and $i_w$) are transformed by the coordinate transformation section 103 in accordance with Equation (3) into the two-phase currents ($i_{s\alpha}$ and $i_{s\beta}$) in the coordinate system at rest.

$$\begin{bmatrix} i_{s\alpha} \\ i_{s\beta} \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ i_w \end{bmatrix} \quad (3)$$

Note that, because, in Equation (3), the detected motor currents ($i_u$, $i_v$, and $i_w$) are phase currents of the AC motor 101, when two-phase currents are detected, the remaining phase current can be determined using a Kirchhoff's law. Furthermore, the two-phase currents ($i_{s\alpha}$ and $i_{s\beta}$) are two-phase currents in the coordinate system at rest. In the coordinate system at rest, a vector corresponding to the U phase is defined as an a axis that is a reference axis, and a coordinate axis orthogonal to the a axis is defined as a β axis. Here, currents that are included in the two-phase currents ($i_{s\alpha}$ and $i_{s\beta}$) and that have a frequency in a frequency band the same as the frequency band of the frequency of the output current $I_h$ are defined as two-phase currents ($i_{s\alpha h}$ and $i_{s\beta h}$).

Typically, current elements in the coordinate system at rest are represented by a vector multiplication. In the vector multiplication, a voltage element to be applied to the rotating coordinate system is multiplied by a coordinate transformation matrix using the actual magnetic-pole position θ, a matrix using the inverse of an inductance and a differential operator (s), a coordinate transformation matrix using a phase error Δθ (=θ−θ*) between the actual magnetic-pole position θ and a control magnetic-pole position θ*. In other words, the voltage element to be applied to the rotating coordinate system is integrated, divided by an inductance, and subjected to coordinate transformation, and subjected to coordinate transformation in consideration of the phase error Δθ, thereby obtaining the current elements in the coordinate system at rest.

By utilizing the above-mentioned vector multiplication, the square-wave voltage command $V_h$ (the voltage amplitude command $\Delta V_h$ and the phase command $\Delta \theta_h$) is controlled, and $\Delta V_{dh}$ based on the square-wave voltage command $V_h$ is provided as a square-wave voltage command only for the control magnetic-pole position θ*, whereby the two-phase currents ($i_{s\alpha h}$ and $i_{s\beta h}$) that are current elements in the coordinate system at rest can be computed in accordance with Equation (4). Note that ($L_{dh}$ and $L_{qh}$) are inductances of the AC motor 101 which are determined at a phase of the magnetic-pole position θ and at a phase that is 90° advanced from the phase, respectively, and which are determined for a frequency band of a frequency $\omega_h$ of the square-wave voltage command $V_h$.

$$\begin{aligned}
\begin{bmatrix} i_{s\alpha h} \\ i_{s\beta h} \end{bmatrix} &= \begin{bmatrix} \cos\theta & -\sin\theta \\ \sin\theta & \cos\theta \end{bmatrix} \begin{bmatrix} \frac{1}{L_{dh} \cdot s} & 0 \\ 0 & \frac{1}{L_{qh} \cdot s} \end{bmatrix} \\
&\quad \begin{bmatrix} \cos\Delta\theta & \sin\Delta\theta \\ -\sin\Delta\theta & \cos\Delta\theta \end{bmatrix} \begin{bmatrix} \Delta V_{dh} \\ 0 \end{bmatrix} \\
&= \begin{bmatrix} \left\{ \frac{1}{L_{dh}} \cos\theta\cos\Delta\theta + \frac{1}{L_{qh}} \sin\theta\sin\Delta\theta \right\} \frac{\Delta V_{dh}}{s} \\ \left\{ \frac{1}{L_{dh}} \sin\theta\cos\Delta\theta - \frac{1}{L_{qh}} \cos\theta\sin\Delta\theta \right\} \frac{\Delta V_{dh}}{s} \end{bmatrix} \\
&= \begin{bmatrix} \left\{ \frac{1}{L_{dh}} \cos\theta\cos\Delta\theta + \frac{1}{L_{qh}} (\sin^2\theta\cos\theta^* - \sin\theta\cos\theta\sin\theta^*) \right\} \frac{\Delta V_{dh}}{s} \\ \left\{ \frac{1}{L_{dh}} \sin\theta\cos\Delta\theta - \frac{1}{L_{qh}} (\cos\theta\sin\theta\cos\theta^* - \cos^2\theta\sin\theta^*) \right\} \frac{\Delta V_{dh}}{s} \end{bmatrix} \\
&= \begin{bmatrix} \left\{ \frac{1}{L_{dh}} \cos\theta\cos\Delta\theta + \frac{1}{L_{qh}} (\cos\theta^* - \cos\theta(\cos\theta\cos\theta^* - \sin\theta\sin\theta^*)) \right\} \frac{\Delta V_{dh}}{s} \\ \left\{ \frac{1}{L_{dh}} \sin\theta\cos\Delta\theta - \frac{1}{L_{qh}} (\sin\theta(\cos\theta\cos\theta^* + \sin\theta\sin\theta^*) - \sin\theta^*) \right\} \frac{\Delta V_{dh}}{s} \end{bmatrix} \\
&= \begin{bmatrix} \left\{ \frac{1}{L_{dh}} \cos\theta\cos\Delta\theta + \frac{1}{L_{qh}} (\cos\theta^* - \cos\theta\cos\Delta\theta) \right\} \frac{\Delta V_{dh}}{s} \\ \left\{ \frac{1}{L_{dh}} \sin\theta\cos\Delta\theta - \frac{1}{L_{qh}} (\sin\theta\cos\Delta\theta - \sin\theta^*) \right\} \frac{\Delta V_{dh}}{s} \end{bmatrix}
\end{aligned} \quad (4)$$

-continued $$= \begin{bmatrix} \left\{\left(\dfrac{1}{L_{dh}} - \dfrac{1}{L_{qh}}\right)\cos\theta\cos\Delta\theta + \dfrac{1}{L_{qh}}\cos\theta^*\right\}\dfrac{\Delta V_{dh}}{s} \\ \left\{\left(\dfrac{1}{L_{dh}} - \dfrac{1}{L_{qh}}\right)\sin\theta\cos\Delta\theta + \dfrac{1}{L_{qh}}\sin\theta^*\right\}\dfrac{\Delta V_{dh}}{s} \end{bmatrix}$$

Furthermore, the integral of the square-wave voltage command $\Delta V_{dh}$ is represented by Equation (5) using the output current $I_h$ and the frequency $\omega_h$ of the square-wave voltage command $V_h$.

$$\dfrac{\Delta V_{dh}}{s} = L_{dh} \cdot I_h = L_{dh} \cdot \dfrac{|\Delta V_{dh}|}{\omega_h L_{dh}} \dfrac{I_h}{|I_h|} = \dfrac{|\Delta V_{dh}|}{\omega_h} \dfrac{I_h}{|I_h|} \quad (5)$$

Equation (6) that is derived by using Equations (4) and (5) described above represents the two-phase currents ($i_{s\alpha h}$ and $i_{s\beta h}$), which are current elements having a frequency in a frequency band the same as the frequency band of the frequency of the output current $I_h$.

$$\begin{bmatrix} i_{s\alpha h} \\ i_{s\beta h} \end{bmatrix} = \begin{bmatrix} \dfrac{|\Delta V_{dh}|}{\omega_h L_{dh} L_{qh}}\{(L_{qh} - L_{dh})\cos\theta \cdot \cos\Delta\theta + L_{dh}\cos\theta^*\} \cdot \dfrac{I_h}{|I_h|} \\ \dfrac{|\Delta V_{dh}|}{\omega_h L_{dh} L_{qh}}\{(L_{qh} - L_{dh})\sin\theta \cdot \cos\Delta\theta + L_{dh}\sin\theta^*\} \cdot \dfrac{I_h}{|I_h|} \end{bmatrix} \quad (6)$$

$$\approx \begin{bmatrix} \dfrac{|\Delta V_{dh}|}{\omega_h L_{dh}}\cos\theta \cdot \dfrac{I_h}{|I_h|} \\ \dfrac{|\Delta V_{dh}|}{\omega_h L_{dh}}\sin\theta \cdot \dfrac{I_h}{|I_h|} \end{bmatrix} (\because \Delta\theta \approx 0)$$

As described above, when there is a deviation between the inductances ($L_{dh}$ and $L_{qh}$) of the AC motor 101 that are determined for the frequency band of the frequency $\omega_h$ of the square-wave voltage command $V_h$, i.e., when the AC motor 101 has a magnetic saliency, the amplitudes of the two-phase currents ($i_{s\alpha h}$ and $i_{s\beta h}$), i.e., the information obtained using the output current $I_h$, includes the information concerning the magnetic-pole position $\theta$.

Note that examples of a motor having a magnetic saliency include a motor in which a permanent magnet is embedded, a synchronous reactance motor, an induction motor in which inductance is changed by magnetic saturation, and so forth.

Next, a method for computing the magnetic-pole position $\theta$ using the two-phase currents ($i_{s\alpha h}$ and $i_{s\beta h}$), which is used by the magnetic-pole-position computing section 105, will be described.

Figure 6:
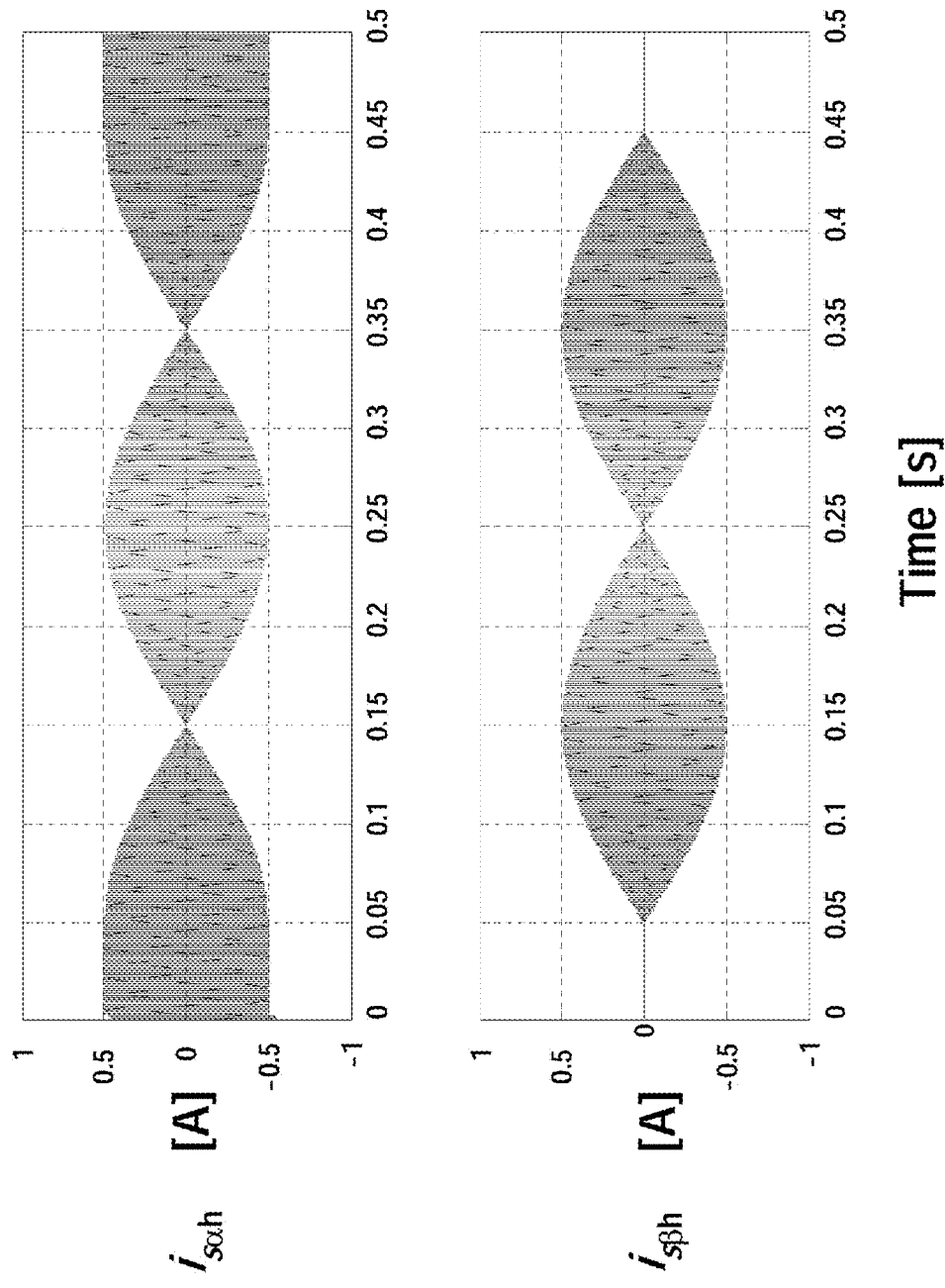
FIG. 6 includes waveforms of two-phase currents when the square-wave voltage generator operates.

FIG. 6 includes waveforms of the two-phase currents ($i_{s\alpha h}$ and $i_{s\beta h}$) in a case in which the control that is described with reference to FIG. 5 is performed while the AC motor 101 is being driven at a speed of 2.5 Hz. As is clear from FIG. 6, the two-phase currents ($i_{s\alpha h}$ and $i_{s\beta h}$) have a phase relationship that is the same as the phase relationship between a $\cos\theta$ function and a $\sin\theta$ function. Extraction of elements having the frequency $\omega_h$ of the square-wave voltage command $V_h$ is equivalent to extraction of vertices of the triangular waveforms of the two-phase currents ($i_{s\alpha h}$ and $i_{s\beta h}$).

Referring to FIG. 1, the two-phase currents ($i_{s\alpha}$ and $i_{s\beta}$) that are outputs of the coordinate transformation section 103 are input to the envelope extractor 104. The envelope extractor 104 extracts, as two-phase current values ($I_{cos}$ and $I_{sin}$), information items concerning envelopes that are obtained by connecting the vertices of the waveforms of the two-phase currents ($i_{s\alpha h}$ and $i_{s\beta h}$). The envelope extractor 104 outputs the two-phase current values ($I_{cos}$ and $I_{sin}$) to the magnetic-pole-position computing section 105. The magnetic-pole-position computing section 105 computes the magnetic-pole position $\theta$ using the two-phase current values ($I_{cos}$ and $I_{sin}$) in accordance with Equation (7) using arctangent computation.

$$\theta = \tan^{-1}\left(\dfrac{I_{sin}}{I_{cos}}\right) \quad (7)$$

Before the AC motor 101 is activated, the magnetic-pole position $\theta$ is set to be zero. By setting the phase error $\Delta\theta$ to be zero once, even while the AC motor 101 is being driven, the phase error $\Delta\theta$ can be held in a state in which the phase error $\Delta\theta$ is approximately zero.

Additionally, the magnetic-pole position $\theta$ can be computed in accordance with Equation (8) without using arctangent computation.

$$\cos\theta = I_{cos}/\sqrt{I_{cos}^2 + I_{sin}^2}$$

$$\sin\theta = I_{sin}/\sqrt{I_{cos}^2 + I_{sin}^2} \quad (8)$$

The two-phase current values ($I_{cos}$ and $I_{sin}$) are sequentially output from the envelope extractor 104 every time period $T_s$. Accordingly, the magnetic-pole position $\theta$ can be computed without using sample values of currents detected in the past. With the computed magnetic-pole position $\theta$, a voltage phase $\theta_v$ that is to be used in the voltage controller 110 can be determined in accordance with Equation (9).

$$\theta_r = \text{mod}\left[\left(\theta + \tan^{-1}\left(\dfrac{v_{sq}^*}{v_{sd}^*}\right)\right) / (\pi/3)\right] \quad (9)$$

Here, mod is a function in which an integer is divided, and in which a reminder of the division is returned. A quotient of the division is used to determine a sector to which the command voltage vector $v_s^*$ is to be applied (a quadrant that is mentioned, in the description regarding the space voltage-vector modification method).

Similarly, when the square-wave voltage command $V_h$ is provided only for a position that is a phase of 90° advanced from the magnetic-pole position $\theta$, the two-phase currents ($i_{s\alpha h}$ and $i_{s\beta h}$) are represented by Equation (10).

$$\begin{bmatrix} i_{s\alpha h} \\ i_{s\beta h} \end{bmatrix} = \begin{bmatrix} -\dfrac{|\Delta V_{dh}|}{\omega_h L_{dh}}\sin\theta \cdot \dfrac{I_h}{|I_h|} \\ \dfrac{|\Delta V_{dh}|}{\omega_h L_{dh}}\cos\theta \cdot \dfrac{I_h}{|I_h|} \end{bmatrix} \quad (10)$$

Also in this case, information obtained using the amplitudes of the two-phase currents ($i_{s\alpha h}$ and $i_{s\beta h}$) also includes the information concerning the magnetic-pole position $\theta$. Accordingly, the magnetic-pole position $\theta$ can be computed by extracting elements having the frequency $\omega_h$ of the square-wave voltage command $V_h$ in a manner similar to the above-described manner using Equations (7) and (8).

As describe in FIG. 1, the magnetic-pole position θ that is an output of the magnetic-pole-position computing section 105 is input to the voltage controller 110, and also input to the speed computing section 106 at the same time.

The speed computing section 106 differentiates the magnetic-pole position θ that is computed in accordance with Equation (7), thereby computing the speed estimation value $\hat{\omega}_r$. The speed estimation value $\hat{\omega}_r$ is input to the subtracter 107 together with the speed command value $\omega_r^*$ that is supplied from an external section. In a case in which position control is performed, although the case is not illustrated, a position controller that estimates the position of a rotating shaft of the AC motor 101 using the magnetic-pole position θ and that performs control so that the position of the rotating shaft will coincide with a position command value which is supplied from an external section is added. An output of the position controller is used as the speed command value $\omega_r^*$.

Figure 2:
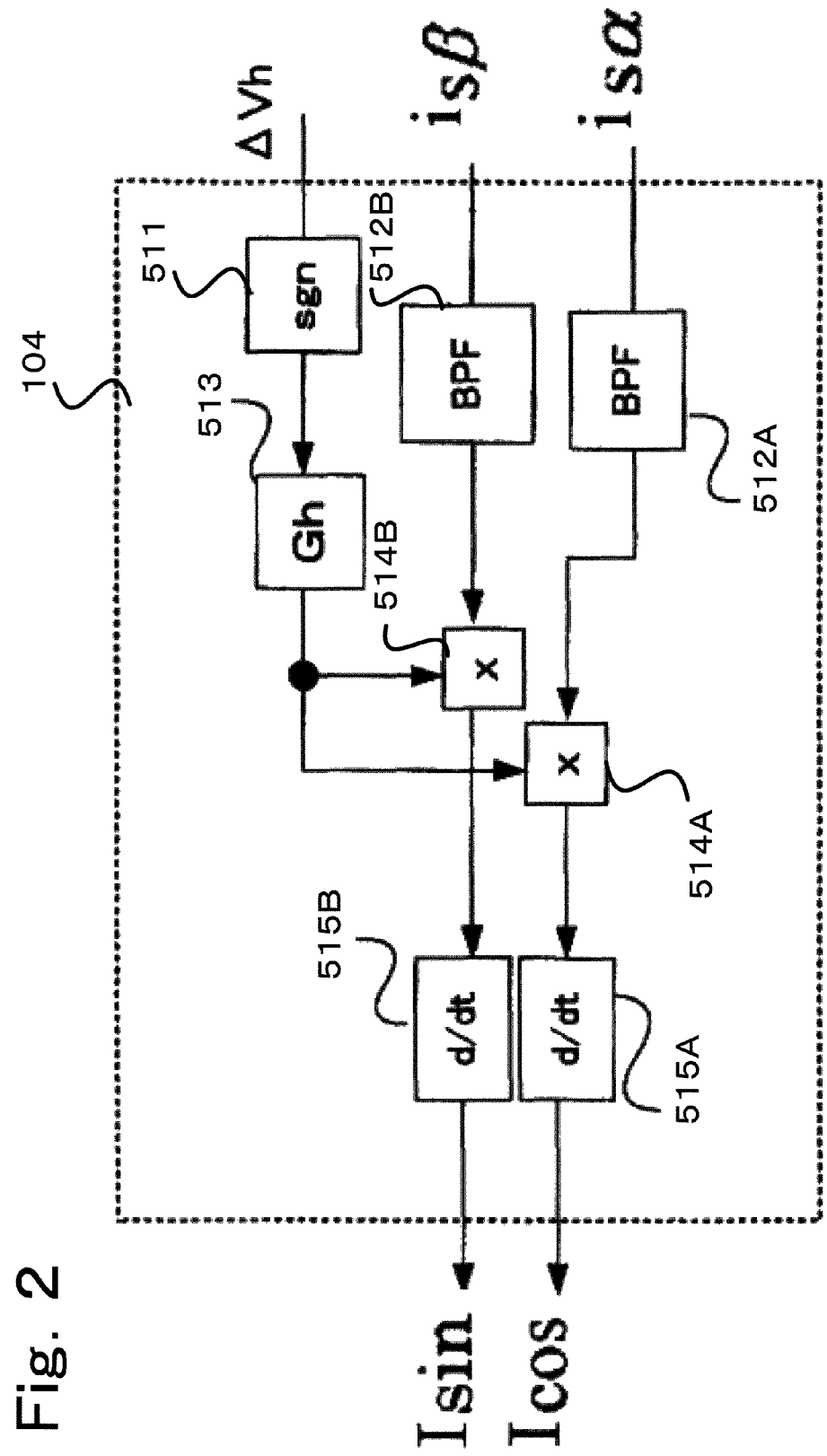
FIG. 2 is a diagram for explaining an envelope extractor in the first embodiment.

Finally, the details of the envelope extractor 104 will be described with reference to FIG. 2. FIG. 2 is a block diagram of a configuration of the envelope extractor 104. The envelope extractor 104 includes a sign determination unit 511, band-pass filters (BPFs) 512A and 5128, a gain multiplier 513, multipliers 514A and 514B, and differentiators 515A and 515B.

The square-wave voltage command $\Delta V_h$ is input from the square-wave voltage generator 109 to the sign determination unit 511. The sign determination unit 511 determines the sign of the square-wave voltage command $\Delta V_h$. When the sign is positive, the sign determination unit 511 outputs 1, and, when the sign is negative, the sign determination unit 511 outputs −1.

The two-phase currents ($i_{s\alpha}$ and $i_{s\beta}$) that are outputs of the coordinate transformation section 103 are input to the band-pass filters (BPFs) 512A and 512B, respectively. The band-pass filters (BPFs) 512A and 512B are configured to remove, from the two-phase currents ($i_{s\alpha}$ and $i_{s\beta}$), high-frequency elements $4f_h$ that are associated with the switching period of the semiconductor switches, and configured to cause the two-phase currents ($i_{s\alpha h}$ and $i_{s\beta h}$), which are current elements having a frequency in a frequency band the same as the frequency band of the frequency of the output current $I_h$, to pass through the band-pass filters. It is necessary to set a band-pass frequency and an attenuation coefficient so that the phases and gains of the two-phase currents ($i_{s\alpha h}$ and $i_{s\beta h}$) which are to be caused to pass through the band-pass filters are not decreased. However, because the period of the two-phase currents ($i_{s\alpha}$ and $i_{s\beta}$) is twice longer than the switching period, separation of frequencies can be easily performed.

The gain multiplier 513 multiplies an output of the sign determination unit 511 by a gain $G_h$. The multipliers 514A and 514B multiply the two-phase currents ($i_{s\alpha h}$ and $i_{s\beta h}$) by an output of the gain multiplier 513, respectively. The gain $G_h$ is used to increase SN ratios for a case in which the amplitudes of the two-phase currents ($i_{s\alpha h}$ and $i_{s\beta h}$) are small, such as a case in which no load is applied, and is used to amplify the amplitudes of the envelopes connecting the vertices of the triangular waves of the two-phase currents ($i_{s\alpha h}$ and $i_{s\beta h}$) at a timing that is synchronized with the period of the two-phase currents ($i_{s\alpha h}$ and $i_{s\beta h}$).

Full-wave rectification is performed on the two-phase currents ($i_{s\alpha h}$ and $i_{s\beta h}$) so that the two-phase currents ($i_{s\alpha h}$ and $i_{s\beta h}$) will be rectified at a positive side. Then, the amplitudes of the two-phase currents ($i_{s\alpha h}$ and $i_{s\beta h}$) are multiplied by the gain $G_h$ to obtain currents. The obtained currents are outputs of the multipliers 514A and 514B.

The differentiators 515A and 515B differentiate the outputs of the multipliers 514A and 514B, respectively, and output the two-phase current values ($T_{cos}$ and $I_{sin}$) that are envelopes of the obtained currents. Typically, the derivative of a triangular wave is a square wave. Accordingly, the envelopes connecting vertices of the triangular waveforms can be extracted by differentiation.

Note that the differentiators 515A and 515B may be configured using pseudo differentiators having low-pass filter characteristics. When the timing at which provision of the square-wave voltage command $\Delta V_h$ is performed coincides with the timing at which detection of the motor currents is performed as shown in FIG. 5, differentiators can accurately extract the envelopes. However, when the timing at which detection of the motor currents is performed is shifted, the envelopes include noise elements having a pulse shape. In this case, a configuration of the differentiators 515A and 515B using pseudo differentiators that can achieve removal of the noise elements simultaneously with differentiation has an advantage.

Because the AC motor control apparatus I according to the first embodiment of the present invention is configured as described above, even when the voltages that are to be applied in order to drive the AC motor are increased in accordance with an increase in the load or speed of the AC motor, an estimation error does not increase. Furthermore, the magnetic-pole position can be estimated with a high accuracy without a delay time.

Figure 7:
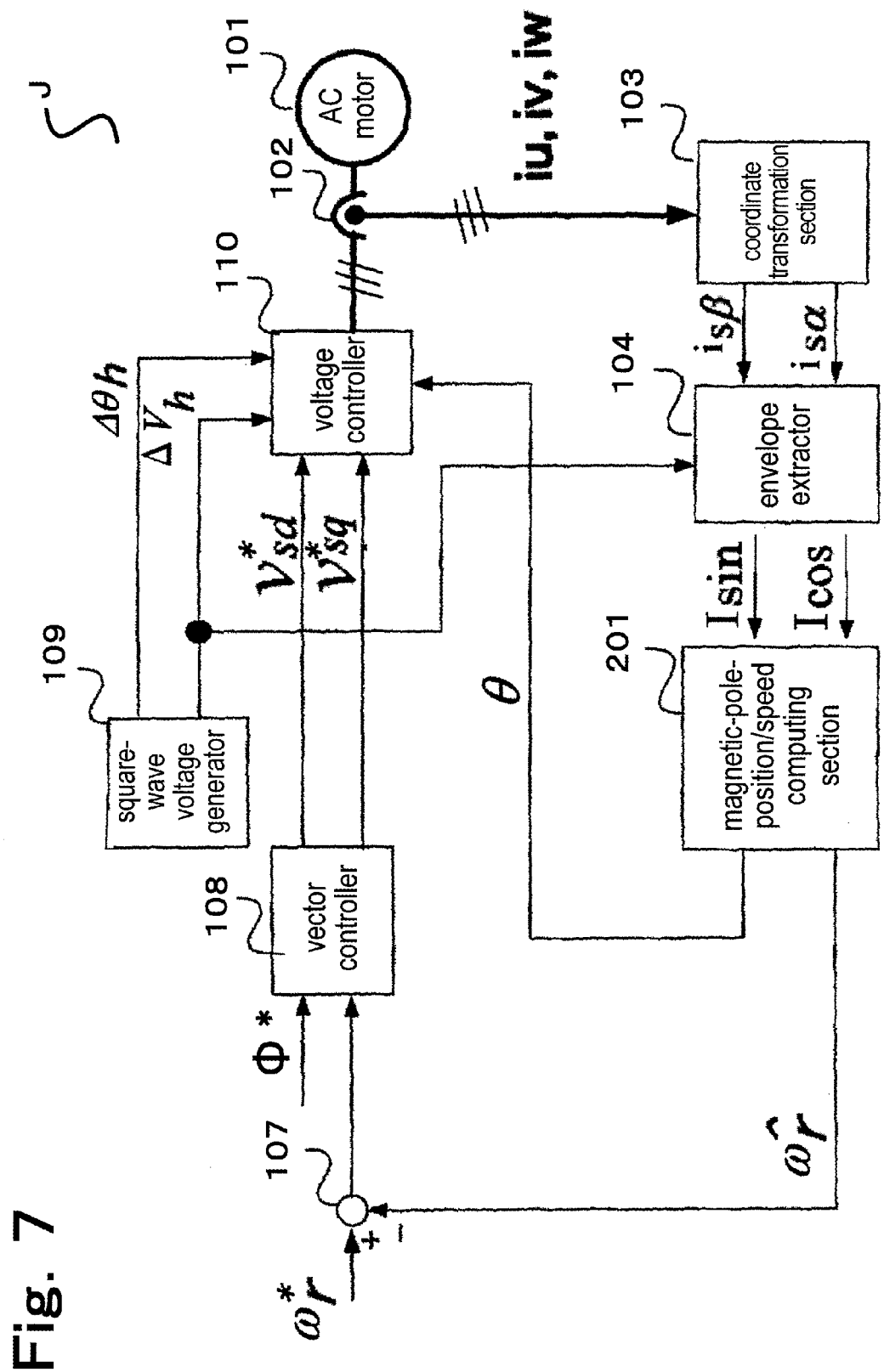
FIG. 7 is a block diagram of an AC motor control apparatus according to a second embodiment.

FIG. 7 is a block diagram of an AC motor control apparatus J according to a second embodiment.

The difference between the AC motor control apparatus J illustrated in FIG. 7 and the AC motor control apparatus I according to the first embodiment illustrated in FIG. 1 is that the magnetic-pole-position computing section 105 and the speed computing section 106 illustrated in FIG. 1 are integrated into a magnetic-pole-position/speed computing section 201. Components that operate in manners that are the same as the manners in which the components illustrated in FIG. 1 operate are denoted by the same reference numerals, and description thereof is omitted.

Figure 8:
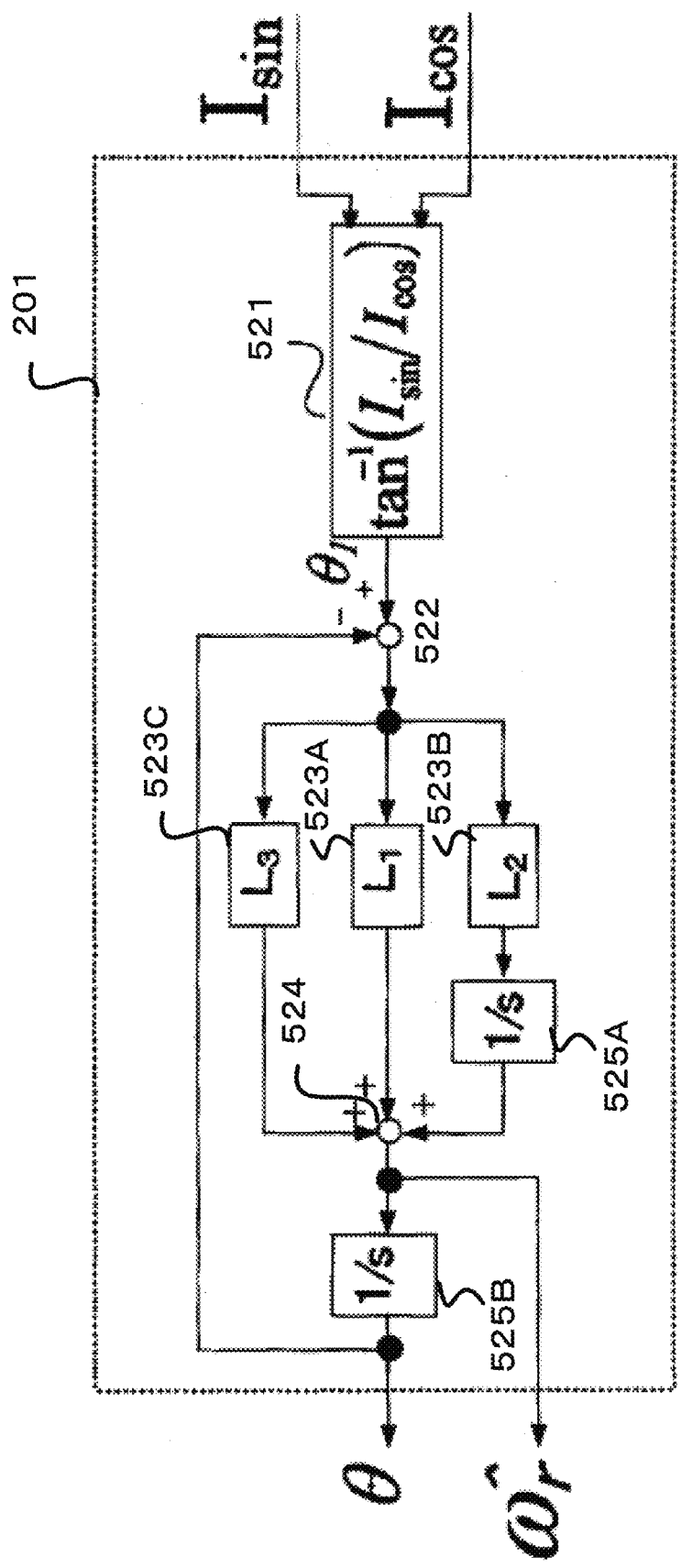
FIG. 8 is a diagram for explaining a magnetic-pole-position/speed computing section in the second embodiment.

Next, the details of the magnetic-pole-position/speed computing section 201 will be described with reference to FIG. 8. The magnetic-pole-position/speed computing section 201 includes an arctangent computing unit 521, a subtracter 522, gain multipliers 523A, 523B, and 523C, an adder 524, and integrators 525A and 525B.

The arctangent computing unit 521 computes a first magnetic-pole position $\theta_1$ in accordance with Equation (7) using the two-phase current values ($I_{cos}$ and $I_{sin}$) that are envelope signals which are input.

The subtracter 522 subtracts a final magnetic-pole position θ, which is obtained by computation given below, from the first magnetic-pole position $\theta_1$, to obtain a deviation, and outputs the deviation.

The gain multipliers 523A, 523B, and 523C multiply the deviation, which is an output of the subtracter 522, by gains $L_1$, $L_2$, and $L_3$, respectively.

The adder 524 adds outputs of the gain multipliers 523A and 523C to a value obtained by integrating an output of the gain multiplier 523B with the integrator 525A, thereby computing the speed estimation value $\hat{\omega}_r$ in accordance with Equation (11). Note that the first term of Equation (11) in the right side indicates a function of a proportional-plus-integral controller which operates so that the deviation which is the output of the subtracter 522 is made to be zero, and the second term indicates a function of a forward compensator which is used to increase a response in computation of the speed.

$$\hat{\omega}_r = \left(L_1 + \frac{L_2}{s}\right)(\theta_1 - \theta) + L_3(\theta_1 - \theta) \tag{11}$$

The integrator 525B integrates the speed estimation value $\hat{\omega}_r$, thereby determining the final magnetic-pole position θ.

In the AC motor control apparatus J according to the second embodiment of the present invention, computation of the speed is performed without using differentiation. Thus, noise that occurs in the units which perform differentiation can be reduced. Furthermore, because control is performed so that the first magnetic-pole position θ₁ will be close to the final magnetic-pole position θ, a delay in estimation of the magnetic-pole position θ can be reduced.

Figure 9:
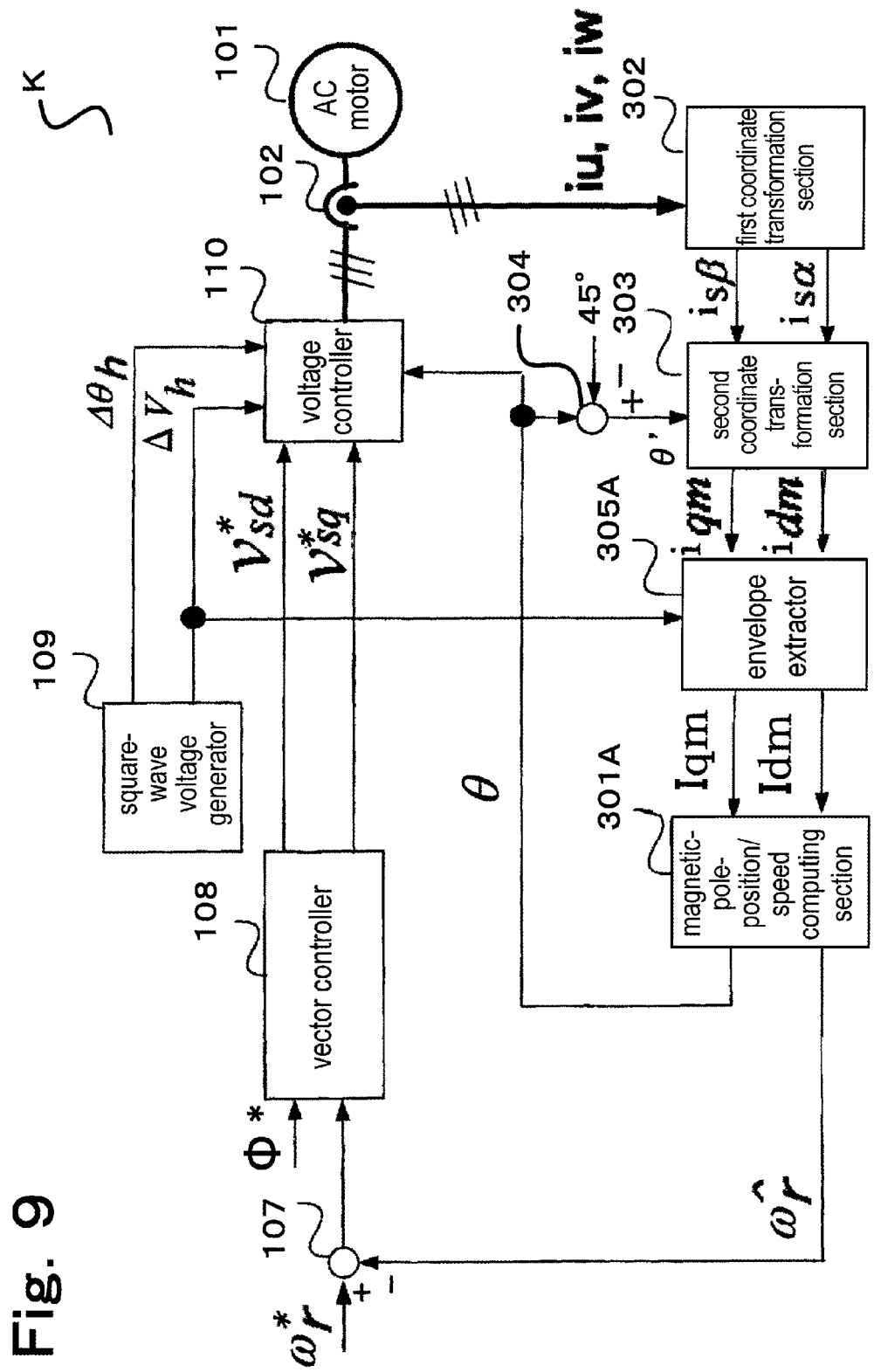
FIG. 9 is a block diagram of an AC motor control apparatus according to a third embodiment.

FIG. 9 is a block diagram of an AC motor control apparatus K according to a third embodiment.

The difference between the AC motor control apparatus K illustrated in FIG. 9 and the AC motor control apparatus J according to the second embodiment illustrated in FIG. 7 is that a second coordinate transformation section 303 and a subtracter 304 are newly added to the AC motor control apparatus J illustrated in FIG. 7, and that, further, a magnetic-pole-position/speed computing section 301A is provided instead of the magnetic-pole-position/speed computing section 201 of the AC motor control apparatus J illustrated in FIG. 7. Note that a first coordinate transformation section 302 and an envelope extractor 305A correspond to the coordinate transformation section 103 and the envelope extractor 104 of the AC motor control apparatus J illustrated in FIG. 7, respectively. Components that operate in manners that are the same as the manners in which the components illustrated in FIG. 7 operate are denoted by the same reference numerals, and description thereof is omitted.

The subtracter 304 computes a phase θ' that is 45° delayed from the magnetic-pole position θ supplied from the magnetic-pole-position/speed computing section 301A.

The two-phase currents ($i_{sα}$ and $i_{sβ}$) in the coordinate system at rest, which are supplied from the first coordinate transformation section 302, and the phase θ', which is supplied from the subtracter 304, are input to the second coordinate transformation section 303. The second coordinate transformation section 303 performs coordinate transformation on the two-phase currents ($i_{sα}$ and $i_{sβ}$) to obtain two-phase currents ($i_{dm}$ and $i_{qm}$) in a rotating coordinate system for the phase θ'. The second coordinate transformation section 303 outputs the two-phase currents ($i_{dm}$ and $i_{qm}$) to the envelope extractor 305A.

The envelope extractor 305A performs, on the two-phase currents ($i_{dm}$ and $i_{qm}$), a process that is exactly the same as the process performed by the envelope extractor 104 which is described in the first embodiment, thereby computing two-phase current values $I_{dm}$ and $I_{qm}$ that are envelope signals of the two-phase currents ($i_{dm}$ and $i_{qm}$).

Figure 10:
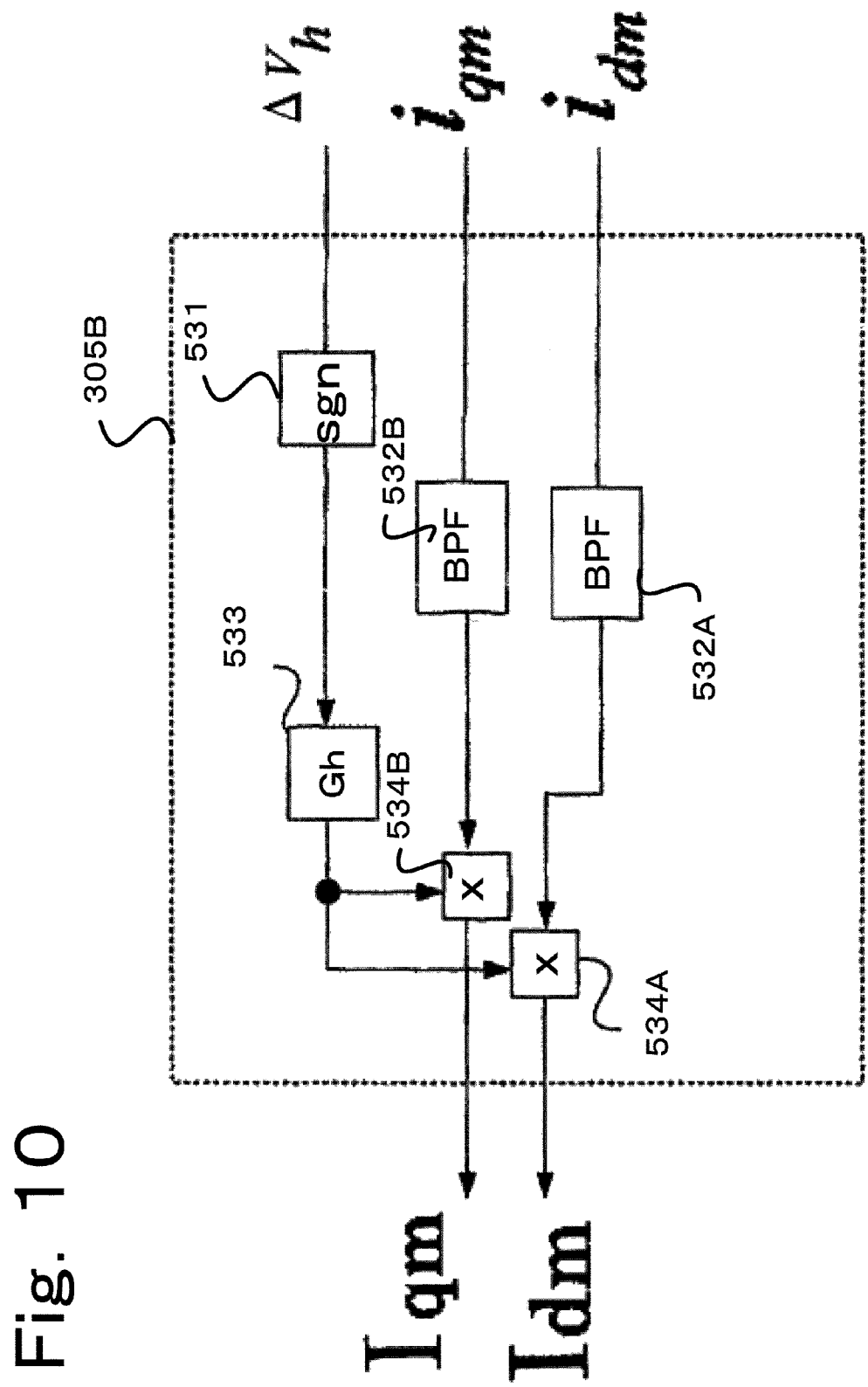
FIG. 10 is a diagram for explaining another envelope extractor in the third embodiment.

Furthermore, the envelope extractor 305A can be configured as an envelope extractor 305B having another configuration illustrated in FIG. 10. The envelope extractor 305B includes a sign determination unit 531, band-pass filters (BPFs) 532A and 532B, a gain multiplier 533, and multipliers 534A and 534B.

In the envelope extractor 305B, because a low-pass band of the band-pass filters (BPFs) 532A and 532B is set to be sufficiently lower than $f_h$, differentiators or pseudo differentiators that are described in the first embodiment are omitted.

Additionally, the envelope extractor 305B may have a configuration in which a low-pass filter (LPF) is added to the final output stage of the envelope extractor 305B so that the flexibility in adjustment of the filters will be increased.

The magnetic-pole-position/speed computing section 301A computes the magnetic-pole position and the speed using output signals that are output from the envelope extractor 305A or 305B, i.e., using the two-phase current values $I_{dm}$ and $I_{qm}$ that are envelope signals of the two-phase currents ($i_{dm}$ and $i_{qm}$).

The details of the magnetic-pole-position/speed computing section 301A will be described with reference to FIG. 11. The magnetic-pole-position/speed computing section 301A includes an arctangent computing unit 535, a subtracter 536, gain multipliers 537A, 537B, and 537C, an adder 538, and integrators 539A and 539B.

The arctangent computing unit 535 computes, using the two-phase current values $L_{dm}$ and $I_{qm}$ that are input, the first magnetic-pole position θ₁ as in accordance with Equation (7).

The subtracter 536 determines an error angle Δθ by subtracting 45° from the first magnetic-pole position θ₁.

The gain multipliers 537A, 537B, and 537C multiply the error angle Δθ by the gains $L_1$, $L_2$, and $L_3$, respectively.

The adder 538 adds outputs of the gain multipliers 537A and 537C to a value obtained by integrating an output of the gain multiplier 537B with the integrator 539A, thereby computing the speed estimation value $\hat{\omega}_r$ in accordance with Equation (12). Note that the first term of Equation (12) in the right side indicates a function of a proportional-plus-integral controller which operates so that the error angle Δθ which is an output of the subtracter 536 will be zero, and the second term indicates a function of a forward compensator which is used to increase a response in computation of the speed.

$$\hat{\omega}_r = \left(L_1 + \frac{L_2}{s}\right)\Delta\theta + L_3\Delta\theta \tag{12}$$

The integrator 539B integrates the speed estimation value $\hat{\omega}_r$, thereby determining the magnetic-pole position θ.

Figure 12:
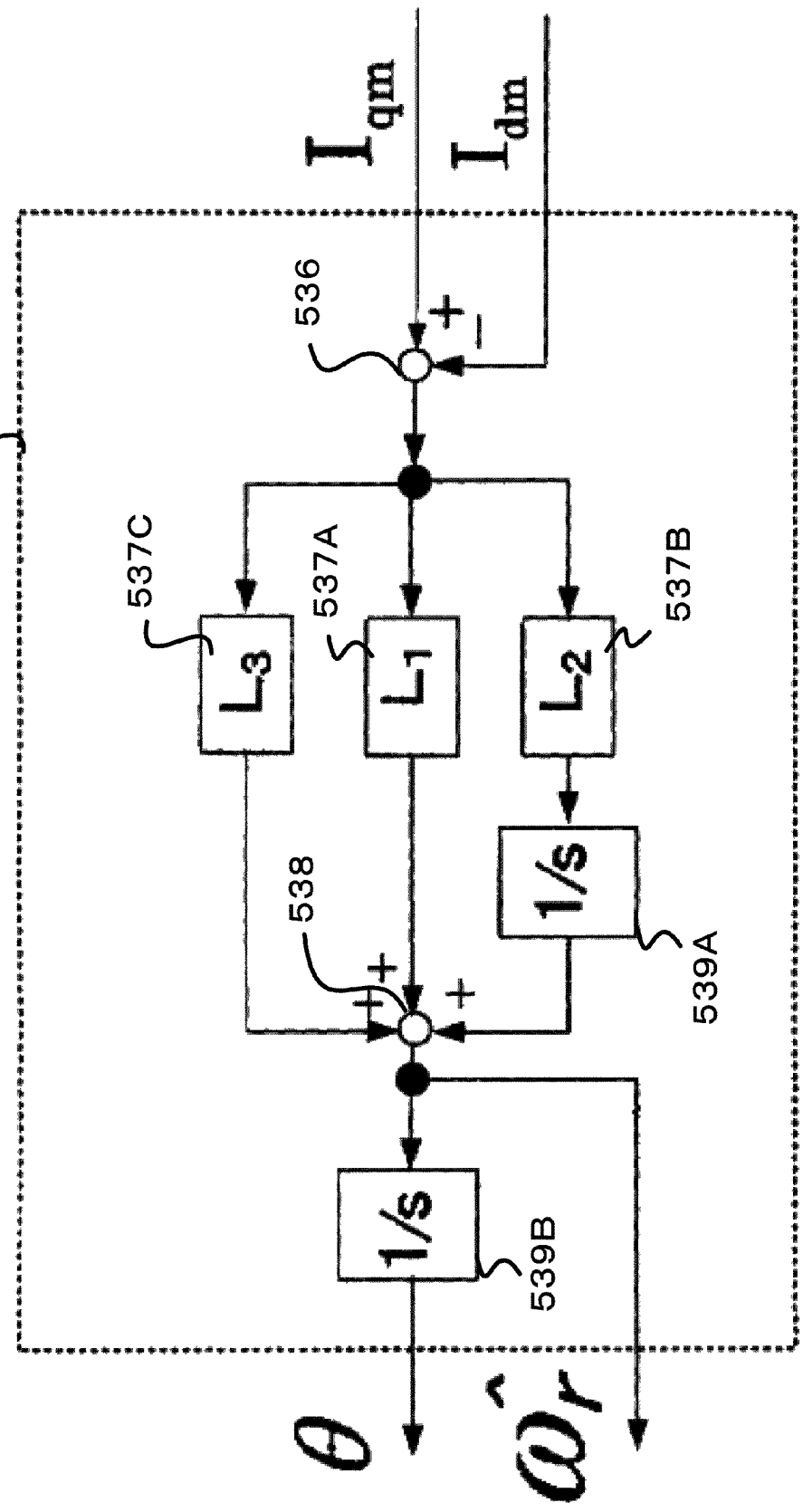
FIG. 12 is a diagram for explaining another magnetic-pole-position/speed computing section in the third embodiment.

Furthermore, the magnetic-pole-position/speed computing section 301A can be configured as a magnetic-pole-position/speed estimating section 301B having another configuration illustrated in FIG. 12. The magnetic-pole-position/speed estimating section 301B includes the subtracter 536, the gain multipliers 537A, 537B, and 537C, the adder 538, and the integrators 539A and 539B. The magnetic-pole-position/speed estimating section 301B does not include the arctangent computing unit 535, and has a configuration in which the subtracter 536 determines the difference between the two-phase current values Idm and Iqm that are envelope signals which are input.

Figure 11:
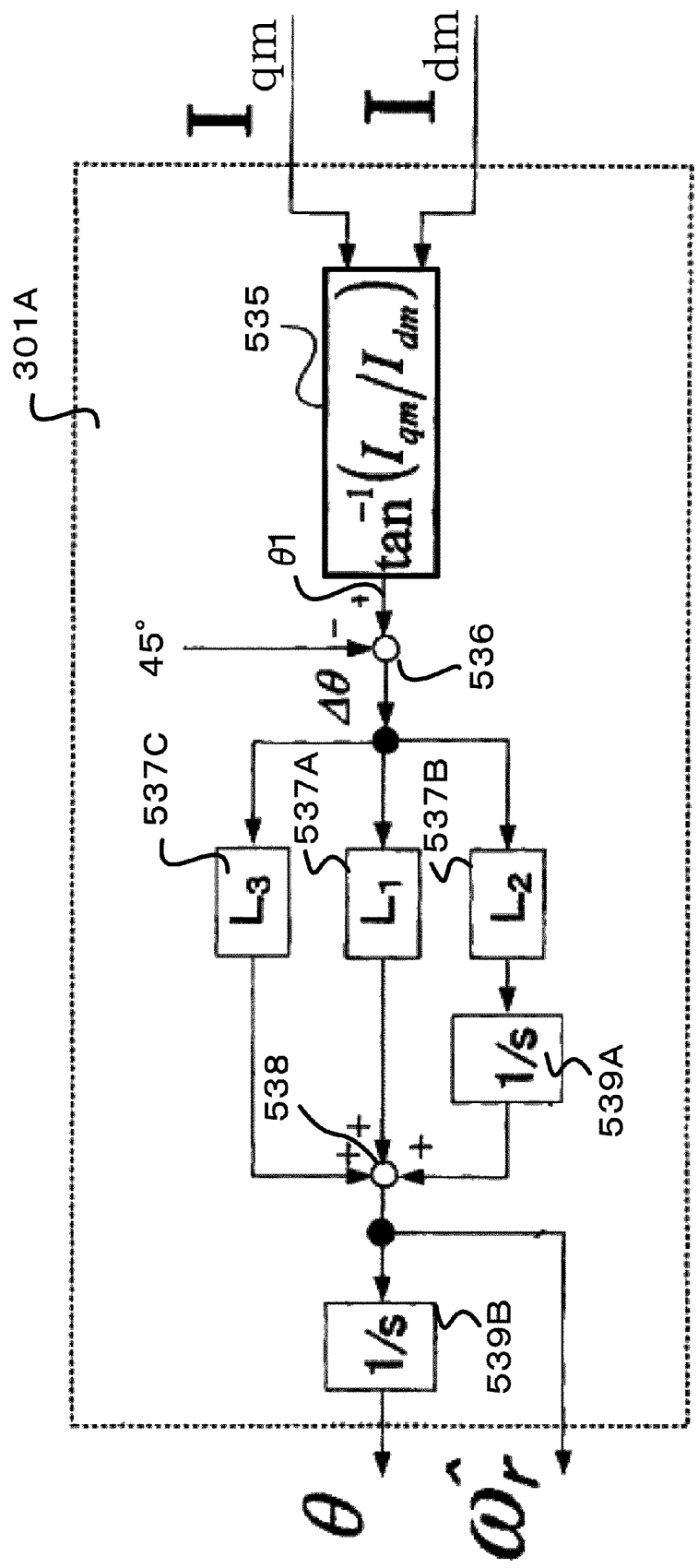
FIG. 11 is a diagram for explaining a magnetic-pole-position/speed estimating section in the third embodiment.

As in the case of the magnetic-pole-position/velocity estimating section 301A illustrated in FIG. 11, the gain multipliers 537A, 537B, and 537C, the adder 538, and the integrators 539A and 539B compute the speed estimation value wr^ in accordance with Equation (13), and, further, determines the magnetic-pole position θ by integration.

$$\hat{\omega}_r = \left(L_1 + \frac{L_2}{s}\right)(I_{qm} - I_{dm}) + L_3(I_{qm} - I_{dm}) \tag{13}$$

In this manner, the speed estimation value $\hat{\omega}_r$, and the magnetic-pole position θ are computed.

Finally, a method for computing the magnetic-pole position and the speed using a rotating coordinate axis (a $d_m$ axis) that is 45° delayed from a control reference axis (a γ axis) will be described with reference to FIGS. 16A and 16B. Note that, in the description with reference to FIGS. 16A and 16B, the actual magnetic-pole position of the AC motor 101 is located in a direction of a d axis.

Figure 16A:
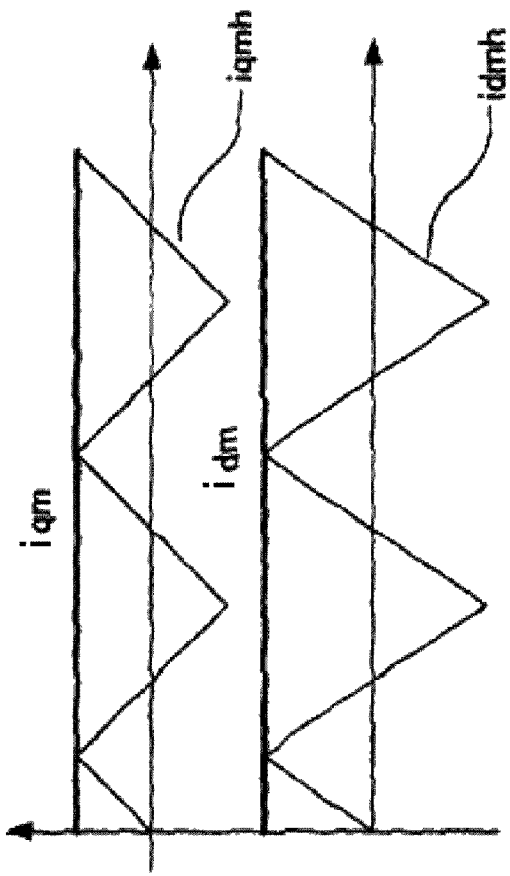
FIGS. 16A and 16B are diagrams for explaining a rotating coordinate axis that is 45° delayed from a control reference axis.

When the square-wave voltage command $\Delta V_{dh}$ is provided for a position corresponding to the γ axis, in a case in which the AC motor 101 has a magnetic saliency, the inductances ($L_{dh}$ and $L_{qh}$) of the AC motor 101 for the frequency band of the frequency $\omega_h$ of the square-wave voltage command $\Delta V_h$ are located in a region indicating inductance distribution illustrated in FIG. 16A. The two-phase currents ($i_{dm}$ and $i_{qm}$) illustrated in FIGS. 16A and 16B include high-frequency currents ($i_{dmh}$ and $i_{qmh}$) that are generated in accordance with provision of the square-wave voltage command $\Delta V_{dh}$.

Figure 16B:
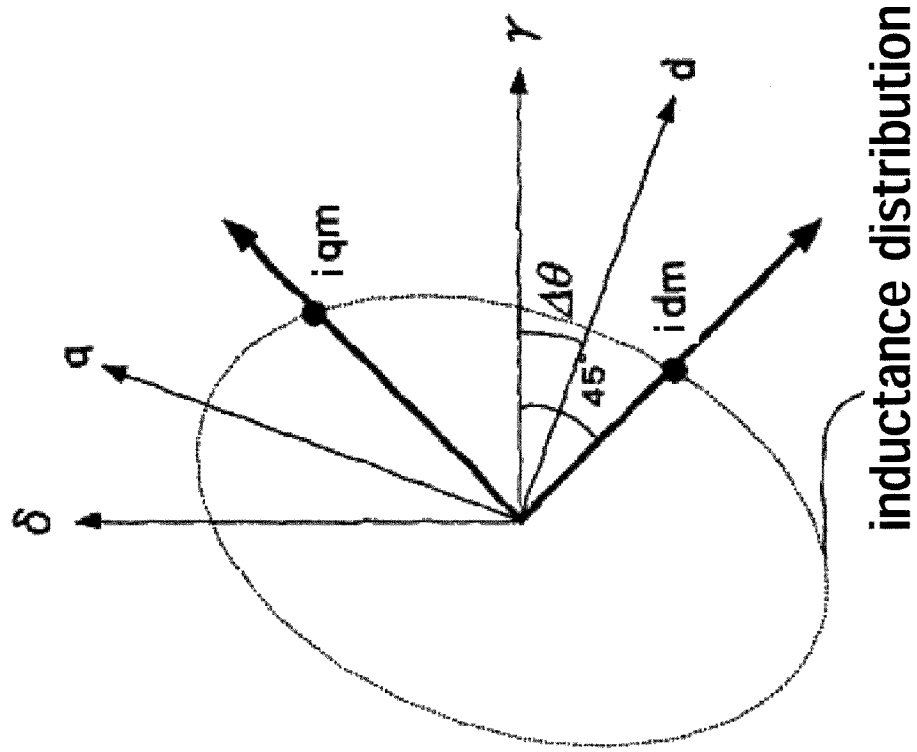

As illustrated in FIG. 16B, when the high-frequency currents ($i_{dmh}$ and $i_{qmh}$) are in respective steady states, the waveforms of the high-frequency currents ($i_{dmh}$ and $i_{qmh}$) are triangular waveforms. The amplitudes of the waveforms are fixed amplitudes, and the frequency of the waveforms is $f_h$. Furthermore, each of the amplitudes of the triangular waveforms depends on a corresponding one of the inductances ($L_{dh}$ and $L_{qh}$). When the inductance is large, the amplitude is small, and, when the inductance is small, the amplitude is large.

In other words, when the control magnetic-pole position coincides with the actual magnetic-pole position, i.e., when the γ axis and the d axis that are illustrated in FIG. 16A coincide with each other, the amplitudes of the high-frequency currents ($i_{dmh}$ and $i_{qmh}$) sandwiching the γ axis and the d axis coincide with each other. The reason for this is that the inductances corresponding to points on the rotating coordinate axis that is 45° delayed from the γ axis are equal to each other because an equation sin45°=cos45° is true.

Accordingly, the two-phase current values $I_{dm}$ and $I_{qm}$ that are envelopes connecting vertices of the respective triangular waveforms of the high-frequency currents ($i_{dmh}$ and $i_{qmh}$) are extracted by the envelope extractor 305A or 305B, and, further, computation is performed by the magnetic-pole-position/velocity computing section 301A or 301B so that the two-phase current values $I_{dm}$ and $I_{qm}$ will coincide with each other, whereby the magnetic-pole position and the speed can be computed.

The AC motor control apparatus K according to the third embodiment of the present invention is configured to utilize points that are located at 45° in the region indicating inductance distribution as described above. Thus, even when a portion of the region indicating inductance distribution that includes a point corresponding to the maximum or minimum value in the inductance distribution is located is distorted, the magnetic-pole position can be computed with a high accuracy.

Furthermore, in the third embodiment, as in the first embodiment, a case is described, in which the square-wave voltage command $\Delta V_{dh}$ is provided only for the control magnetic-pole position. However, computation of the magnetic-pole position can also be performed, in a manner similar to the above-described manner, by providing the square-wave voltage command only for a position that is a phase of 90° advanced from the control magnetic-pole position.

As described above, in each of the first to third embodiments, a configuration is used, in which the square-wave voltage generator, the envelope extractor, and the magnetic-pole-position computing section are provided. The square-wave voltage generator controls, by alternately changing the square-wave voltage command in positive and negative directions every time period $2T_s$ that is arbitrarily set, the amplitudes and phases of the voltages to be applied to the AC motor.

The envelope extractor extracts, using the currents that are detected every time period $T_s$, the envelopes of the currents that change in accordance with the magnetic-pole position. The magnetic-pole-position computing section sequentially computes the magnetic-pole position using the extracted envelopes of the currents. With this configuration, the magnetic-pole position can be estimated with a high accuracy without a delay time. Thus, performance of torque control, speed control, or position control on the AC motor with a high responsiveness can be realized without using a position sensor and a speed sensor.

Figure 13:
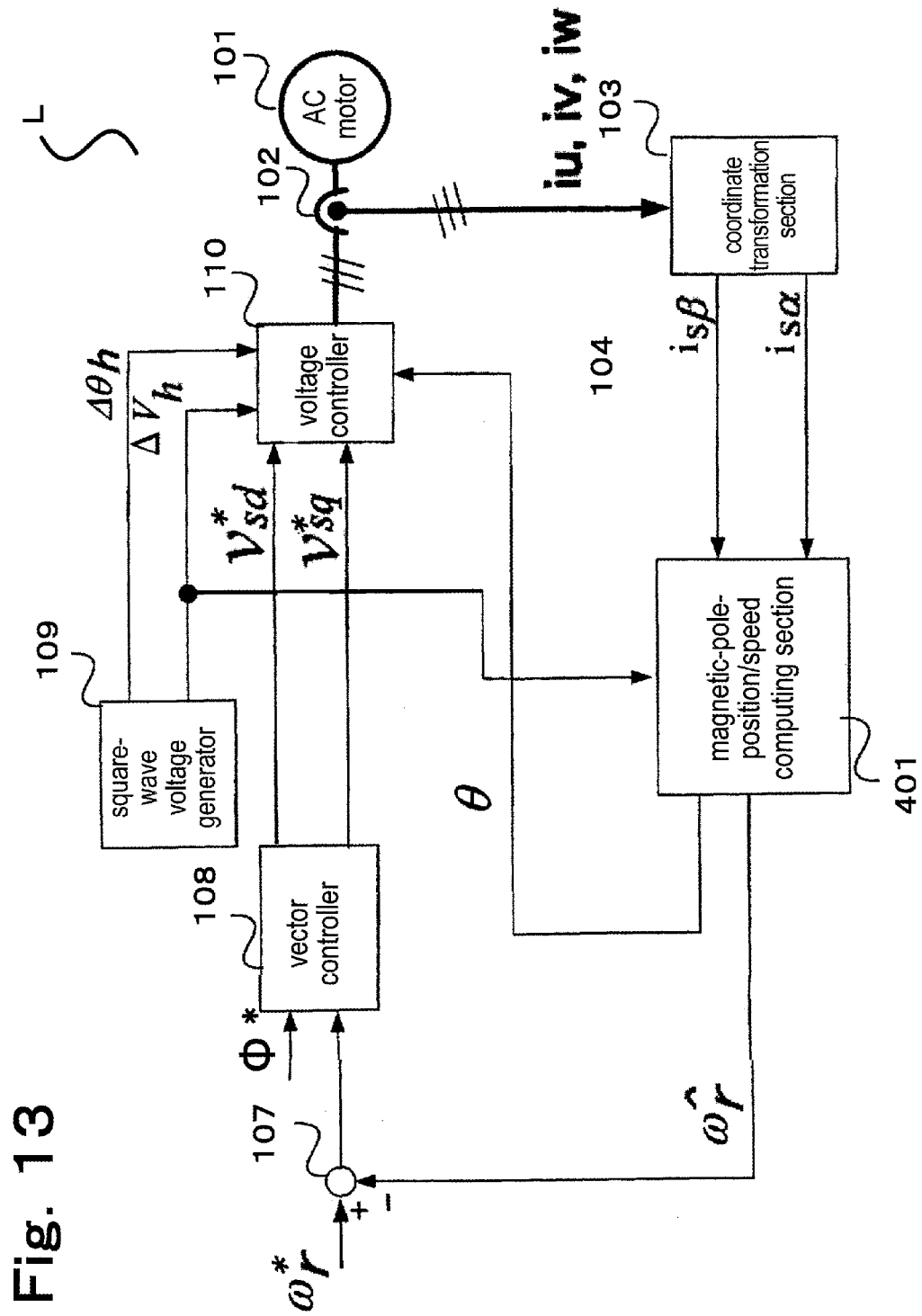
FIG. 13 is a block diagram of an AC motor control apparatus according to a fourth embodiment.

FIG. 13 is a block diagram of an AC motor control apparatus L according to a fourth embodiment.

The difference between the AC motor control apparatus L illustrated in FIG. 13 and the AC motor control apparatus J according to the second embodiment illustrated in FIG. 7 is that the envelope extractor 104 and the magnetic-pole-position/speed computing section 201 of the AC motor control apparatus J illustrated in FIG. 7 are removed, and that a magnetic-pole-position/speed computing section 401 which computes the speed and the magnetic-pole position using the square-wave voltage command $\Delta V_h$ and the two-phase currents ($i_{s\alpha}$ and $i_{s\beta}$) in the coordinate system at rest is added. Components that operate in manners that are the same as the manners in which the components illustrated in FIG. 7 operate are denoted by the same reference numerals, and description thereof is omitted.

Figure 14:
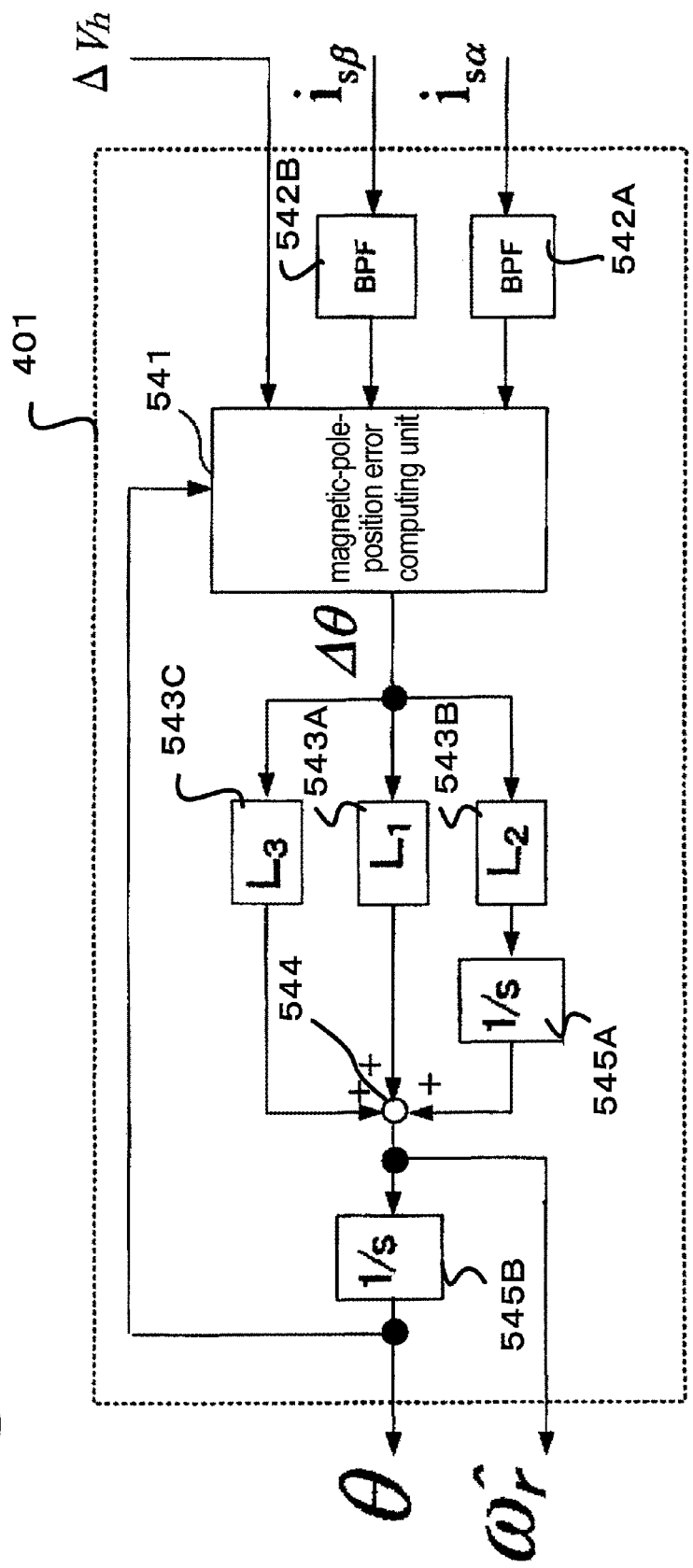
FIG. 14 is a diagram for explaining a magnetic-pole-position/speed computing section in the fourth embodiment.

The details of the magnetic-pole-position/speed computing section 401 will be described with reference to FIG. 14. The magnetic-pole-position/speed computing section 401 includes a magnetic-pole-position error computing unit 541, band-pass filters (BPFs) 542A and 542B, gain multipliers 543A, 543B, and 543C, an adder 544, and multipliers 545A and 545B.

The band-pass filters (BPFs) 542A and 542B take the two-phase currents and ($i_{s\alpha}$ and $i_{s\beta}$) as inputs, and extract the high-frequency currents ($i_{s\alpha h}$, and $i_{s\beta h}$) that are generated in accordance with provision of the square-wave voltage command.

The magnetic-pole-position error computing unit 541 performs computation in accordance with Equation (14) using the square-wave voltage command $\Delta V_h$, the high-frequency currents ($i_{s\alpha h}$ and $i_{s\beta h}$) that are outputs of the band-pass filters (BPFs) 542A and 542B, and the magnetic-pole position θ that is computed using a method described below.

$$v^*_{s\alpha}=|\Delta V_h|\cos\theta$$

$$v^*_{s\beta}=|\Delta V_h|\sin\theta \tag{14}$$

Furthermore, the magnetic-pole-position error computing unit 541 computes reactive power Q and active power P in accordance with Equations (15) and (16), respectively, using voltage elements (vsα* and vsβ*) that are computed in accordance with Equation (14), and the high-frequency currents (isαh and isβh).

$$Q=v^*_{s\beta}i_{s\alpha h}-v^*_{s\alpha}i_{s\beta h} \tag{15}$$

$$P=v^*_{s\alpha}i_{s\alpha h}+v^*_{s\beta}i_{s\beta h} \tag{16}$$

When the calculated magnetic-pole position θ does not have any error, the reactive power Q is zero. Furthermore, the active power P indicates the product of a square-wave voltage and a high-frequency current that is generated by applying the square-wave voltage. The error angle Δθ is computed in accordance with Equation (17) by performing a filtering process using a low-pass filter (LPF) on each of the reactive power Q and the active power P, which are computed in accordance with Equations (15) and (16), respectively, and by performing division.

$$\Delta\theta = LPF(Q)/LPF(P) \quad (17)$$

Computation in accordance with Equations (14) to (17) given above is performed by the magnetic-pole-position error computing unit 541.

Next, the speed estimation value $\hat{\omega}_r$ is computed in accordance with Equation (12) so that the computed error angle $\Delta\theta$ is made to be zero. Further, the magnetic-pole position $\theta$ is computed by integrating the speed estimation value $\hat{\omega}_r$. The computation of the speed estimation value $\hat{\omega}_r$ and the magnetic-pole position $\theta$ is performed by the gain multipliers 543A, 543B, and 543C, the adder 544, and the multipliers 545A and 545B.

Additionally, in a case of computation of the speed, the computation of the active power P and the subtraction in the computation of the error angle $\Delta\theta$ can be performed in consideration of the gains that are included in Equation (12).

In the fourth embodiment, as in the second embodiment, a case is described, in which the square-wave voltage command $\Delta V_{dh}$ is provided only for the control magnetic-pole position. However, computation of the magnetic-pole position can also be performed, in a manner similar to the above-described manner, by providing the square-wave voltage command only for a magnetic-pole position that is a phase of 90° advanced from the control magnetic-pole position.

In the AC motor control apparatus L according to the fourth embodiment of the present invention, by using the computed amounts of the reactive power and the active power, the magnetic-pole position can be estimated with a high accuracy without a delay time even in a case in which the envelope extractor is omitted. Thus, performance of torque control, speed control, or position control on the AC motor with a high responsiveness can be realized without using a position sensor and a speed sensor.

In the present specification, as described above, when the space voltage-vector modification method is used, with respect to the central time of each of the time periods that are arbitrarily set, output patterns of a voltage in time periods that are half of the time periods before and after the central time are completely symmetric. Accordingly, noise elements other than current elements that are used in computation of the magnetic-pole position and in computation of the speed can be reduced to the maximum degree. Thus, a scheme using the space voltage-vector modification method is described. In a case in which a command voltage is not changed in each of time periods that are arbitrarily set as in the embodiments which are described in the present specification, even with a triangular-wave comparison PWM modulation method that is in widespread use, advantages that are similar to the above-described advantages can be obtained by considering application of the command voltage. In this case, it is necessary to provide a voltage command value for applying an averaged voltage value for each phase in the time periods that are arbitrarily set, and further, to add, to the voltage command value, an offset voltage which is provided so that a central time at which switching is performed coincides with the central time of each of the time periods that are arbitrarily set.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An alternating-current motor control apparatus comprising:
    a voltage controller configured to output a command voltage vector so that the command voltage vector is time-averaged for time periods;
    a square-wave voltage generator configured to control, using a square-wave voltage command that is alternately changed in positive and negative directions every time period, amplitudes and phases of voltages to be applied to an alternating-current motor;
    a current detector configured to detect motor currents at a timing that is synchronized with periods which are 1/N-th of the time periods, where N is equal to or larger than one;
    a coordinate transformer configured to perform coordinate transformation to transform the motor currents detected by the current detector into input two-phase currents in a coordinate system at rest;
    an envelope extractor comprising:
        a first extractor configured to generate output two-phase currents including waveforms having amplitudes that periodically change based on the input two-phase currents; and
        a second extractor configured to perform one of differential processing and pseudo differential processing with respect to the output two-phase currents to extract envelopes connecting vertices of the amplitudes of the waveforms;
    a magnetic-pole-position computer configured to compute, using the envelopes extracted by the second extractor, a magnetic-pole-position computation value to obtain a magnetic-pole position; and
    a speed computer configured to compute a speed of the alternating-current motor using the magnetic-pole-position computation value.

2. The alternating-current motor control apparatus according to claim 1,
    wherein the first extractor comprises
        band-pass filters configured to extract, from the input two-phase currents that are outputs of the coordinate transformer, current elements generated in accordance with provision of the square-wave voltage command, and
        multipliers configured to multiply, by a sign of the square-wave voltage command, the current elements extracted by the band-pass filters, and
    wherein the second extractor comprises pseudo differentiators configured to differentiate output values that are output from the multipliers, and configured to remove frequency elements having a frequency corresponding to the periods that are 1/N-th of the time periods.

3. The alternating-current motor control apparatus according to claim 1, wherein the magnetic-pole-position computer is configured to compute the magnetic-pole position by arctangent computation using the envelopes extracted by the second extractor.

4. The alternating-current motor control apparatus according to claim 1, wherein, when the speed computer considers the magnetic-pole-position computation value as a first magnetic-pole-position computation value and computes a second magnetic-pole-position computation value, the speed computer is configured to compute the speed in the form of a speed computation value so that a deviation between the first magnetic-pole-position computation value and the second magnetic-pole-position computation value is made to be zero.

5. The alternating-current motor control apparatus according to claim 4, wherein the second magnetic-pole-position computation value is determined by integrating the speed computation value.

6. A alternating-current motor control apparatus comprising:
- a voltage controller configured to output a command voltage vector so that the command voltage vector is time-averaged for time periods;
- a square-wave voltage generator configured to control, using a square-wave voltage command that is alternately changed in positive and negative directions every time period, amplitudes and phases of voltages to be applied to an alternating-current motor;
- a current detector configured to detect motor currents at a timing that is synchronized with periods which are 1/N-th of the time periods, where N is equal to or larger than one;
- a coordinate transformation section configured to perform coordinate transformation to transform detected values of the motor currents into two-phase currents in a coordinate system at rest;
- an envelope extractor configured to take, as inputs, the two-phase currents, configured to extract two-phase currents as waveforms having amplitudes that periodically change from the input two-phase currents, and configured to extract envelopes connecting vertices of the amplitudes of the waveforms;
- a magnetic-pole-position computing section configured to obtain information concerning a magnetic-pole position in the form of a magnetic-pole-position computation value by computation using the envelopes of the two-phase currents that are outputs of the envelope extractor, and configured to output the magnetic-pole-position computation value; and
- a speed computing section configured to compute a speed of the alternating-current motor using the magnetic-pole-position computation value, wherein the envelope extractor comprises
- band-pass filters configured to extract, from the two-phase currents that are outputs of the coordinate transformation section, two-phase currents that are current elements generated in accordance with provision of the square-wave voltage command, whereby the extracted two-phase currents pass through the band-pass filters,
- multipliers configured to multiply, by a sign of the square-wave voltage command, the two-phase currents that are outputs of the band-pass filters, and
- differentiators configured to differentiate output values that are output from the multipliers.

7. An alternating-current motor control apparatus comprising:
- a voltage controller configured to output a command voltage vector so that the command voltage vector is time-averaged for time periods;
- a square-wave voltage generator configured to control, using a square-wave voltage command that is alternately changed in positive and negative directions every time period, amplitudes and phases of voltages to be applied to an alternating-current motor;
- a current detector configured to detect motor currents at a timing that is synchronized with periods which are 1/N-th of the time periods, where N is equal to or larger than one;
- a first coordinate transformer configured to perform coordinate transformation to transform detected values of the motor currents into first two-phase currents in a coordinate system at rest;
- a second coordinate transformer configured to perform coordinate transformation to transform, into second two-phase currents in a rotating coordinate system for a phase that is 45 degrees delayed from a control magnetic-pole position, at least currents that are included in the first two-phase currents in the coordinate system at rest and that are generated in accordance with provision of the square-wave voltage command;
- an envelope extractor comprising:
  - a first extractor configured to extract, from the second two-phase currents in the rotating coordinate system, output two-phase currents including current elements that are generated in accordance with provision of the square-wave voltage command; and
  - a second extractor configured to perform one of differential processing and pseudo differential processing with respect to the output two-phase currents to extract, as two scalar currents, envelopes connecting vertices of the amplitudes of the current elements; and
- a magnetic-pole-position and speed computer configured to estimate a magnetic-pole position using the two scalar currents extracted by the second extractor, and configured to compute a speed of the alternating-current motor.

8. The alternating-current motor control apparatus according to claim 7,
wherein the first extractor comprises
- band-pass filters configured to extract, from the second two-phase currents in the rotating coordinate system, the current elements generated in accordance with provision of the square-wave voltage command, and
- multipliers configured to multiply, by a sign of the square-wave voltage command, the current elements extracted by the band-pass filters, and wherein the second extractor comprises differentiators configured to differentiate output values that are output from the multipliers.

9. The alternating-current motor control apparatus according to claim 7,
wherein the first extractor comprises
- band-pass filters configured to extract, from the second two-phase currents in the rotating coordinate system, the current elements generated in accordance with provision of the square-wave voltage command, and
- multipliers configured to multiply, by a sign of the square-wave voltage command, the current elements extracted by the band-pass filters, and wherein the second extractor comprises pseudo differentiators configured to differentiate output values that are output from the multipliers, and configured to remove frequency elements having a frequency corresponding to the periods that are 1/N-th of the time periods.

10. The alternating-current motor control apparatus according to claim 7,
wherein the first extractor comprises
- band-pass filters configured to extract, from the second two-phase currents in the rotating coordinate system, two-phase currents including frequency elements having a frequency corresponding to the time periods, and
- multipliers configured to multiply, by a sign of the square-wave voltage command, the two-phase currents extracted by the band-pass filters.

11. The alternating-current motor control apparatus according to claim 7,
wherein the first extractor comprises
band-pass filters configured to extract, from the second two-phase currents in the rotating coordinate system, two-phase currents including frequency elements having a frequency corresponding to the time periods,
multipliers configured to multiply, by a sign of the square-wave voltage command, the two-phase currents extracted by the band-pass filters, and
low-pass filters configured to extract offset amounts from outputs values that are output from the multipliers.

12. The alternating-current motor control apparatus according to claim 7, wherein the magnetic-pole-position and speed computer is configured to compute the speed so that a deviation between the two scalar currents is made to be zero.

13. The alternating-current motor control apparatus according to claim 7, wherein the magnetic-pole-position and speed computer is configured to compute the magnetic-pole position by integrating the speed.

* * * * *